Figure 1:
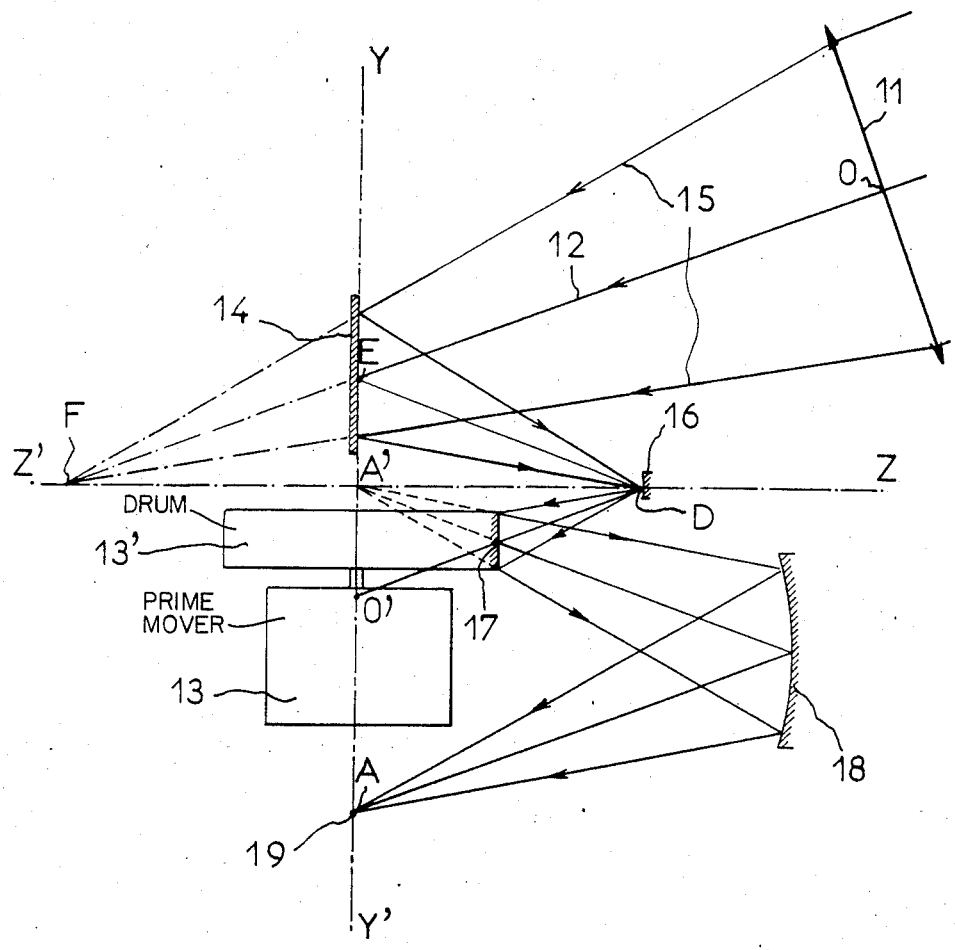

United States Patent [19]

Loy

[11] Patent Number: 4,687,933
[45] Date of Patent: Aug. 18, 1987

[54] OPTICAL AND MECHANICAL SCANNING DEVICE

[75] Inventor: Fernand R. Loy, Sceaux, France

[73] Assignee: Telecommunications Radioelectriques et Telephoniques, TRT, Paris, France

[21] Appl. No.: 859,997

[22] Filed: Dec. 9, 1977

Related U.S. Application Data

[63] Continuation-in-part of Ser. No. 654,386, Feb. 2, 1976.

[30] Foreign Application Priority Data

Dec. 14, 1976 [FR] France .................. 76 37685
Dec. 14, 1976 [FR] France .................. 76 37686
Jan. 26, 1977 [FR] France .................. 77 02161

[51] Int. Cl.$^4$ .................. G02B 26/08; G02B 26/10
[52] U.S. Cl. .................. 250/334; 350/6.8; 358/113
[58] Field of Search .......... 350/6, 7, 285, 6.8; 250/334; 358/113

[56] References Cited

U.S. PATENT DOCUMENTS 3,817,593 6/1974 Harris et al. .................. 350/6
3,829,192 8/1974 Wheeler .................. 350/7
3,912,927 10/1975 Hoffman, II .................. 250/234

*Primary Examiner*—Stephen C. Buczinki
*Attorney, Agent, or Firm*—Stevens, Davis, Miller & Mosher

[57] ABSTRACT

An optical and mechanical scanner including a device for scanning a field of vision to detect and recognize with high resolution distant objects in the field of vision. Scanning is accomplished in two directions including a direction x for line scanning and a direction y for raster or image scanning. One embodiment of the scanning device includes, in order along the direction of a path of a mean incident beam from the field of vision, an objective, a raster scanning mirror for scanning in the y direction, a field mirror which delimits the field of the objective in the x direction, a rotating drum and an image transport system for line scanning in the x direction, the field mirror deflecting the beams towards the drum, and a detector sensitive to the radiation contained in the beams, the scanning device ensuring convergence of the beams at the detector.

The scanner also includes a system for direct visualization of the image scanned, and in one embodiment the scanner has scanning and visualization beams using different paths symmetrical with respect to a plane. The direct visualization system includes the drum, another reflecting surface of the scanning mirror, the detector, a second image transport system and a second field mirror which are symmetrical about an axis with respect to the other transport system and field mirror, respectively, a plane mirror, an electroluminescent diode symmetrical about the plane mirror with respect to the detector, and a circuit for feeding signals to the diode corresponding to the field image being scanned.

43 Claims, 26 Drawing Figures

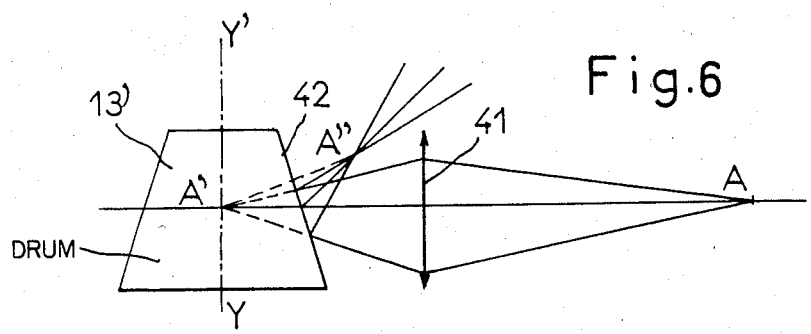
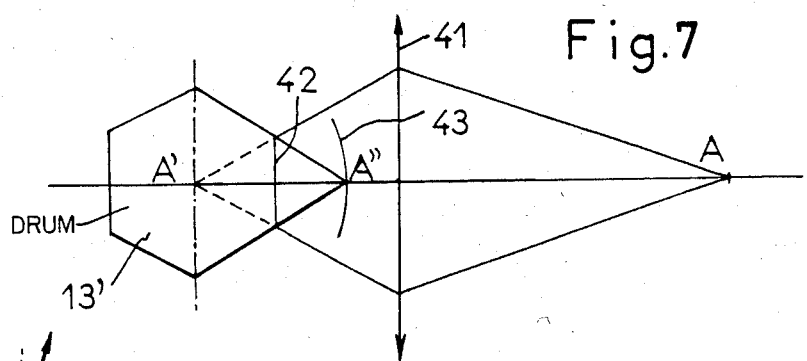
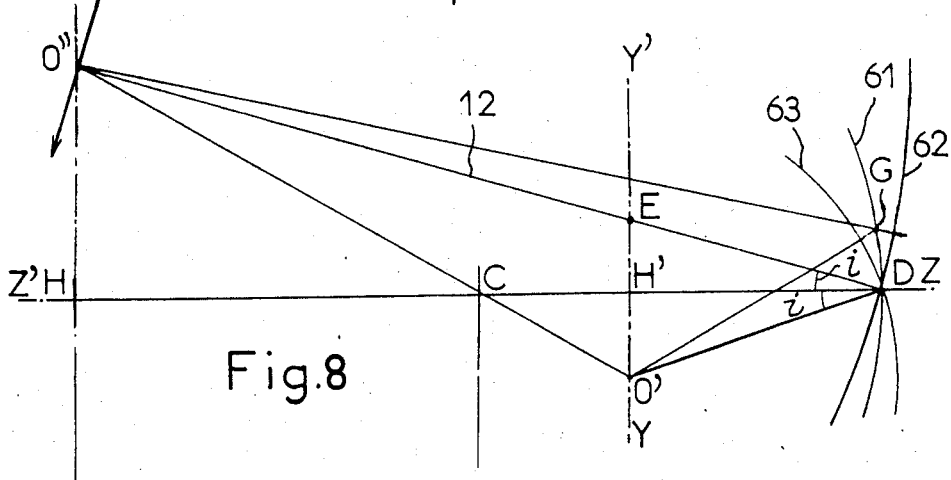
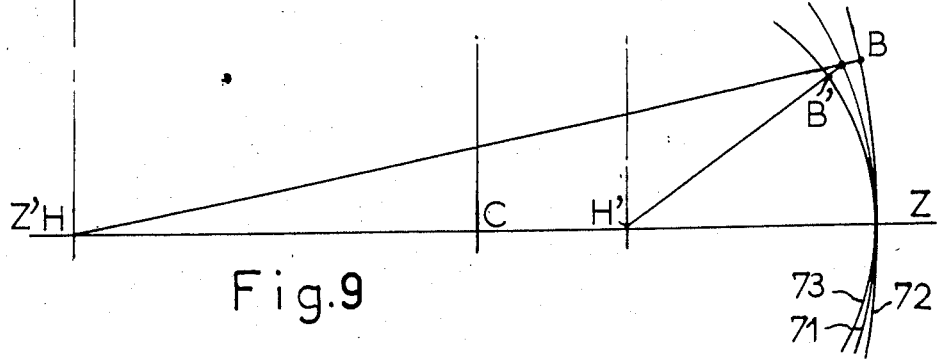

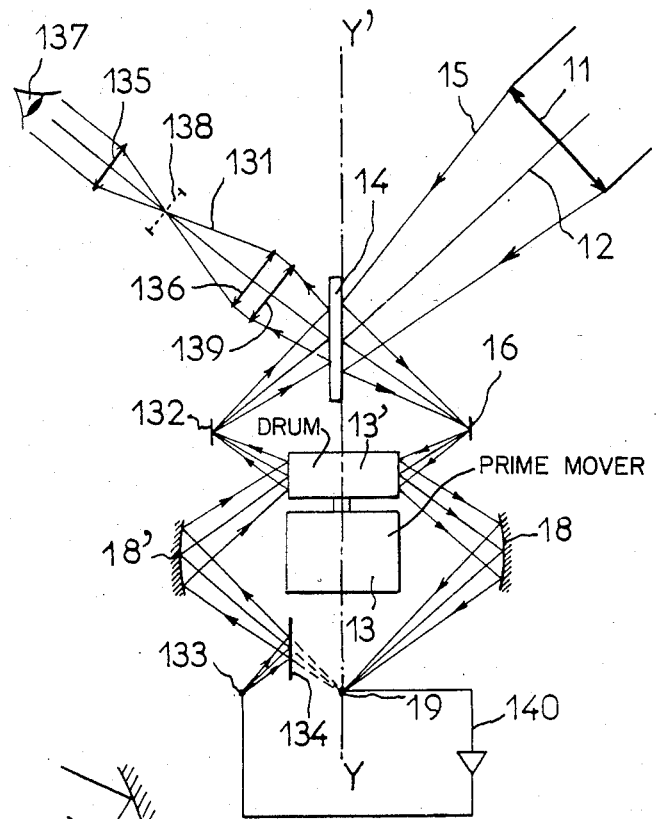
Fig.18
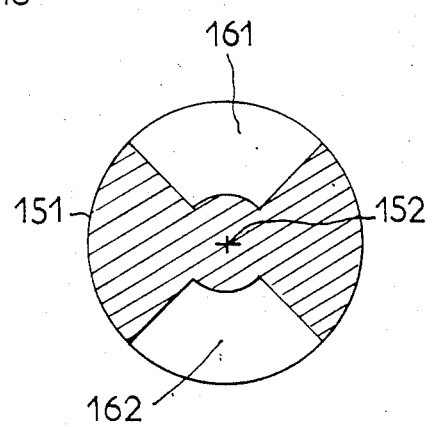
Fig.21
Fig.22

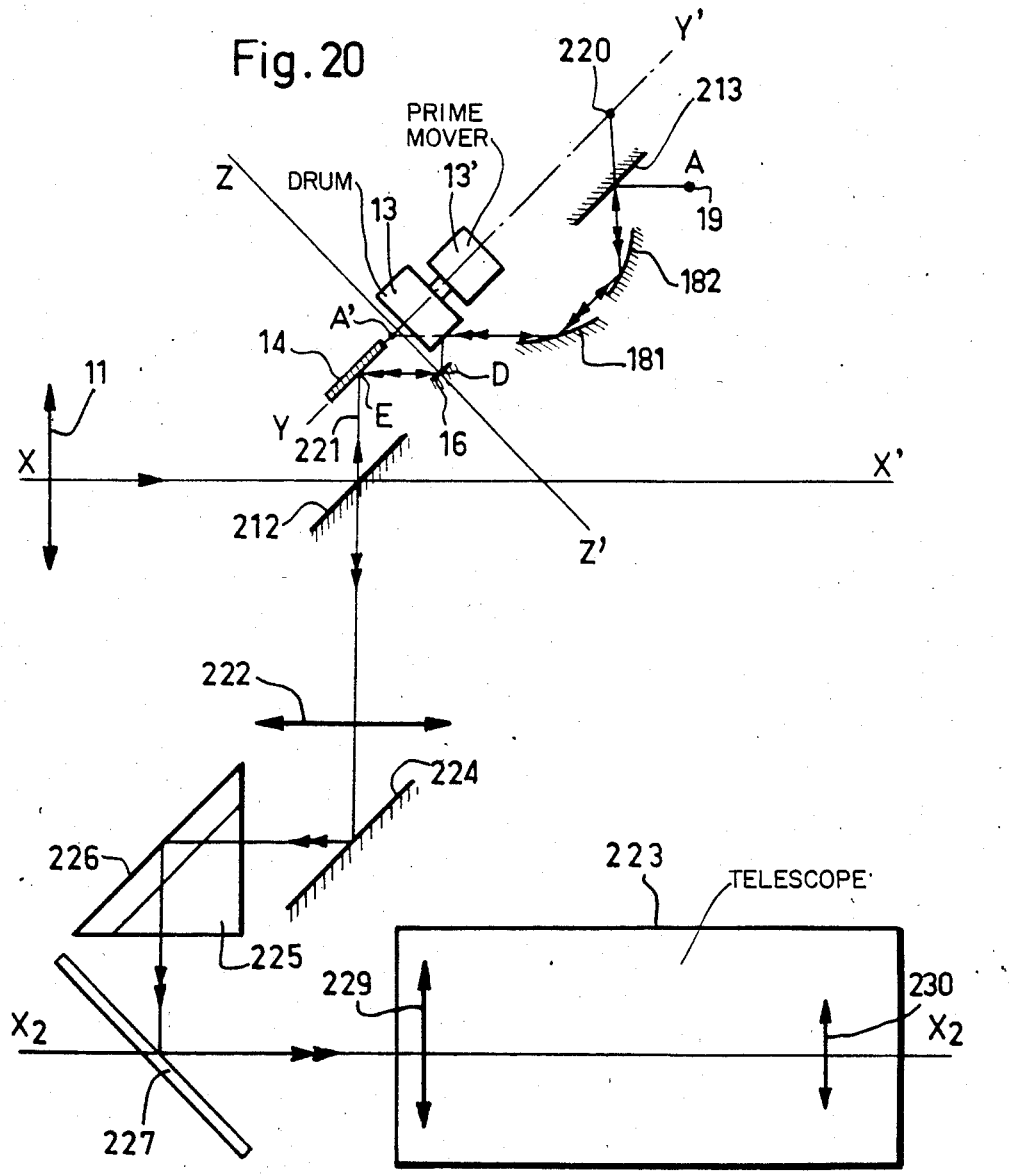

OPTICAL AND MECHANICAL SCANNING DEVICE

CROSS-REFERENCE TO OTHER APPLICATION

This is a continuaton-in-part of application Ser. No. 654,386 filed Feb. 2, 1976.

BACKGROUND OF THE INVENTION

This invention relates to a device for optical scanning of a field of vision divided into different zones, and for the visual display of the aforesaid field. The invention concerns more particularly a device performing field scanning in two directions according to beams from the aforesaid different zones, and which converge on an element sensitive to the radiation contained in the aforesaid beams, the scanner being used optically regardless of the wavelength of the radiation.

Devices of this type are used in particular in terrain visual display equipment in which the terrain is seen according to infrared radiation with a wavelength greater than one micron ($1\mu$). A device such as this, in which the objective is a spherical mirror, and scanning takes place uniquely with mirrors, has been described in French Pat. No. 1,494,805. This known device is of interest because it can be used with a substantial field of vision which, in the limit, could be 180°. On the other hand, it is not well adapted to analyzing a small field with high resolution, which is the case when it is necessary to detect and recognize distant objects in the field of vision, and seen at a reduced angle. It thus is necessary, in effect, to capture a sufficient quantity of the radiation flux emitted by these distant objects. This flux is a function of the surface of the entrance aperture of the device, and actually, in this patent, of the radius of the circle of analysis, and of the numerical aperture of the convergence optics, such that the focal length of the objective is, in principle, equal to the aforesaid radius of analysis.

One possibility of increasing the quantity of flux captured would be to enlarge the aperture of the optics used to converge the beams at the detector. But as this is repeated in several patterns arranged alongside each other about one of the axes of rotation of the scanning system, the number of patterns would be fewer, and this in turn would lead to an increase in the rate of rotation of the aforesaid convergence optics for the same scanning rate, and would pose mechanical realization problems that would be difficult to resolve. Another possibility would be to increase all dimensions of the device according to similarity in construction and position. This, however, would involve excessive bulkiness and too high a moment of inertia of the rotating part.

French patent request No. 73 28 824, filed in the name of the applicant on 7 August 1973, disclosed remedies for some of the above-cited disadvantages. What is realized in order to arrange it so the diameter of the entrance aperture of the device be maximum, and the field of analysis be small, is a system in which the focal length is not bound to the radius of the circle of analysis. This has been done by introducing an optical lens or mirror into the plane of the objective, the purpose of which is to optically conjugate the center of the exit aperture of the objective with that of the detector placed at the center of rotation of the analysis system, the aforesaid element having the advantage of being able to correct the curvature of field of the objective analysis device assembly.

In the device in accordance with this application for a patent, field scanning in one of the directions is accomplished by oscillating the mirror objective about one of its diameters. One of the difficulties that must be resolved with respect to the aperture, when this objective has a large diameter, is how to oscillate a heavy objective at a frequency which, for television images, is of the order of 20 periods per second. Moreover, this mirror objective, even if parabolic, has a field that is limited to few degrees for different aberrations.

In addition, the field of view of the detector must be large enough to accept the flux that traverses the rotating optics during their rotation. The detector, therefore, sees the interior of the analysis device holding the optics, and which device has, most of the time, because of friction, a temperature higher than that of the terrain analyzed. This, in the case of infrared analysis, is followed by the appearance of parasitic modulation of the flux falling on the detector in phase with the line scanning.

Moreover, there is little possibility of placing the detector and the electroluminescent diode in the visible region of the spectrum with a view of direct visual display of the field image by using the analysis system with the reciprocal trajectory because the field image is not isolated.

Then again, in this application for a patent the optics, because they are not uniquely composed of mirrors, make this visual display possible only if the optics are transparent to visible light, something that is difficult to realize when the analysis is made in the far infrared ($10\mu$).

SUMMARY OF THE INVENTION

The device in accordance with the present invention does not have these inconveniences. For reasons of practical use, it is structured in such a way that while being highly compact, and thus limited in bulk, the objective and the detector are separately accessible for multiple uses or for changing their nature to suit such applications as may be desirable. The analysis system, because it is performing in two directions, remains fixed, is suitable for all kinds of objectives and detectors and can be made up of mirrors only.

The structure of the device in accordance with the invention thus makes possible the positioning of the detector and the electroluminescent diode so as to provide a direct visual display of the field image. To avoid parasitic modulation due to rotating parts other than the optics, the line scan optics are divided into two parts; a rotating drum comprising a great many plane reflecting surfaces and rotating about a fixed axis, and a single fixed convergence optics ensuring concentration of flux on the detector, the convergence optics forming an image of the detector on the axis of rotation of the drum, which latter is rotating within the convergent beam.

A concave mirror, called the field mirror, optically conjugates the focal surface of the objective with the line surface analyzed in order to obtain precise focusing throughout the field in the direction of line analysis and, as a result, constant resolution over the entire line analyzed. According to the invention, this optical conjugation is assured by the fact that (1) the objective has a curved focal surface, the center of curvature of which is located in the center of the exit aperture of the objective, and (2) the mirror called the field mirror has the vertex of its surface placed near the vertex of the focal surface of the objective or, more precisely, of the symmetry of the aforesaid vertex with respect to the axis of rotation of the drum. The mirror optically conjugates the center of the exit aperture of the objective with a particular point on the axis of rotation of the drum, the beams being directed toward the line scanning convergence optics after reflection from the faces of the aforesaid drum.

When large diameter objectives are used, and in order to avoid having to make the very heavy masses oscillate in a second direction for raster scanning, scanning in this second direction takes place about an axis perpendicular to the axis of rotation of the drum by using a mobile flat mirror, called the raster analysis mirror. This mirror is placed, generally speaking, in the convergent beam near the focus of the objective, between the objective, and its focus.

Oscillation of the raster analysis mirror in the convergent beam causes the appearance of a supplementary field curvature in the direction of raster scanning. This, in accordance with the invention, is compensated for by a small reciprocating translational motion of the mirror, called the field, in synchronism with the motion of the raster analysis mirror, the translation being perpendicular to the axis of rotation of the drum.

Moreover, in order to compensate for the deviation of the beams introduced into the line analysis system by the raster scanning mirror, and in order to ensure permanence of conjugation on the axis of rotation of line scanning of the center of the exit aperture of the objective with the field mirror, the latter also has imparted to it a reciprocating rotary motion in synchronism with the motion of the raster mirror about an axis parallel to the axis of rotation of the aforesaid raster mirror. Accordingly, the mean ray of any beam from the field retains a constant incidence on the axis of rotation of line scanning as a function of raster scanning.

In order to limit the surface of the raster mirror and thus reduce its oscillating mass, which means placing it as close as to the focus of the objective, a much more complex rolling motion of the aforesaid mirror is provided; that is, a rolling motion without slip along a convex surface. Motion of this type has been described in German Pat. No. 2 011 883.

Described in this patent is a unidirectional field scanner that uses a plane pivoted mirror, and in which the beam is transmitted by an objective, the beam always being focused on the same fixed point. This result is obtained by imparting to the plane mirror a motion such that the mirror always is tangent to an elliptical curve, one of the foci of which is placed in the principal plane of the objective, the other in the so-called fixed point. The focal length f of the objective is equal to the sum of the semiaxes a and b of the ellipse, which is tantamount to saying that a=b. It follows therefore, at least from pure theory, that the ellipse is a circle and that the focal point is located in the principal plane of the objective. Such arrangement, even if realized approximately, would leave very little distance between the objective and the focal point. It thus would be difficult to place the vertex of the field mirror of the optical-mechanical scanner at the focal point, the mirror with its special correction motions being all the more indispensible because the mean rays of the analysis beams have variable orientations as a function of the direction of the field analyzed after their convergence at the fixed point.

Another inconvenience of the device described in the German patent can be attributed to the fact that the mirror rotates in what is practically a circular ellipse in the vicinity of its minor axis at a distance practically half the focal length of the objective. The width of the beam intercepted, and the mirror area, thus are relatively large and the aforesaid mirror as a result is quite heavy and cumbersome.

The intention of the present invention is to impart to the raster mirror a rolling rotary motion without slip on a curve, and thus avoid the inconveniences found in the German patent. This motion is conceived with respect to that of the field mirror in a manner such as to obtain beam focusing at a fixed point located approximately at the vertex of the concave field mirror and reflection of the mean ray of the beam in a stable direction, regardless of the direction of the field analyzed, both at the same time.

In accordance with a embodiment of the invention, raster mirror rolls and pivots on a curve such that it is always located in a position quite close to the focus of the objective. The field mirror has but one rotational motion, synchronized with the motion of the raster mirror and such that it reflects the mean ray of the beam analyzed by the raster mirror according to a fixed ray. In the case when the focal surface of the objective is spherical and the concave surface is turned toward the objective, the curve described by the raster mirror is an ellipse of eccentricity that can be notably different from unity. One of the foci is located in the center of the exit aperture of the objective. The other which is the fixed focal point of the beam, is located approximately at the vertex of the field mirror and is merged with the detector image provided by the line scanning mechanism that arrived in the middle of a line. The field mirror oscillates about an axis passing through this focal point in synchronism with the raster mirror so as to reflect the mean ray of the beam in a fixed direction and to thus ensure the optical conjugation of the center of the exit aperture with a fixed point on the axis of rotation of the line scanning system.

A simplified variant that can be used when the amplitude of raster scanning is limited consists of selecting for the raster mirror's rolling curve a circle tangent to this ellipse at the point of contact with the mirror corresponding to the median direction of the field analyzed, and centered in the center of curvature of the ellipse at the aforesaid point of contact. This will thus introduce a slight defocusing in all directions from the center of the field. This defocusing is reduced by displacing the axis of rotation of the field mirror a very short distance with respect to the focus of the ellipse.

The raster mirror's rolling curve can be a secondorder curve different from an ellipse as a function of the curvature of the objective's focal surface. Thus, this curve is a parabola for a plane focal surface and an objective's exit aperture taken to infinity. It is a hyperbola for a convex focal surface with respect to incident light and an exit aperture located behind the focal surface.

In accordance with the present invention, there has been developed a device for optical scanning of a field of vision divided into different zones. For visual display of the field, the scanning is effected in two perpendicular directions; an x direction (line scanning) and a y direction (raster or image scanning). The device performs scannings in accordance with beams emitted from different zones of the field and ensures convergence of the beams on an element sensitive to the radiation contained in the beams. The device comprises in the order of the orientation of the path of the median incident beam emitted from the field of vision, an objective, a raster scanning mechanism in the y direction, a system of rotation deflection of the beam delimited by the aperture of the objective towards the mechanism for line scanning the image field of the objective in the x direction and a sensitive element. The line scanning mechanism, sensitive element, and, as occasion warrants, elements other than those mentioned provide a direct visual display of the image of the field analyzed. The device is characterized by the following:

(1) The optical axis of the objective is in a plane P containing the y direction and perpendicular to x, the objective is interchangeable, the focal surface of the objective is curved and its center of curvature is located in the center of the exit aperture;

(2) The raster scanning mechanism is comprised of a plane mirror rotating with a reciprocating motion about a fixed or movable axis parallel to the x direction and is placed in a convergent beam behind the objective near the field image in the objective;

(3) The line scanning mechanism is comprised of a drum rotating uniformly about a fixed axis YY' contained in the plane P and having large number of plane reflecting faces regularly distributed on the circumference of the drum. The line scanning system also comprises an image transport system symmetrical with respect to the plane P which forms a virtual image of the sensitive element at a fixed point A' on the YY' axis of rotation of the drum. The drum is placed in a convergent beam in the path of the transport system on the image side of the sensitive element. The symmetrical point with the point A' with respect to each face of the drum when the face is perpendicular to plane P, is in the vicinity of point D which is symmetrical with the focus of the objective with respect to the raster mirror in a position parallel YY' axis;

(4) The optical beam deflection system is comprised of a concave mirror, called the field mirror, having plane P as the plane of symmetry. The vertex of the concave mirror is in the vicinity of D on the ZZ' axis passing through D and perpendicular to YY'. The mirror is located such that it conjugates the center O of the exit aperture of the objective with a fixed point O' on the YY' axis, point O' being symmetrical with the point of intersection of the optical axis of the objective with the YY' axis with respect to ZZ'. The field mirror ensures, should the occasion arise, zero dead time between the scanning of two consecutive lines having at most a width in the x direction which is slightly less than the length of the line analyzed and is itself equal to the distance between the images of the detector in two consecutive faces of the rotating drum. The mirror may be driven with a small amplitude reciprocating motion in phase with the motion of the raster scan mechanism, the small amplitude motion being such that it corrects the defocusing introduced by the raster scan mechanism and ensure fixity in O' of the center O of the exit aperture of the objective conjugated by the field mirror during the reciprocating rotation of the raster scan mechanism.

Figure 2:
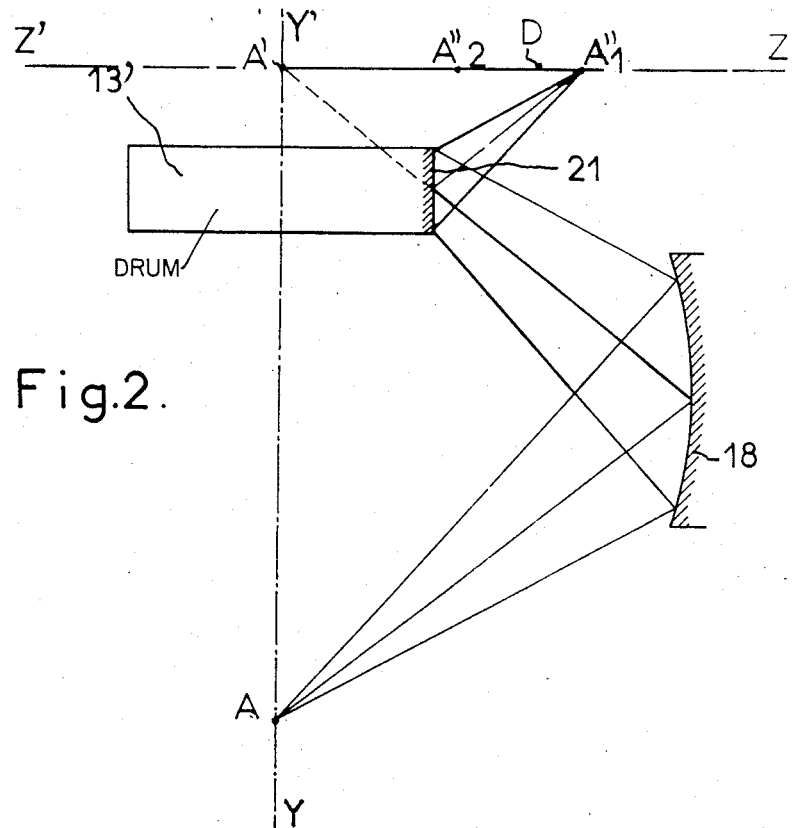
Figure 3:
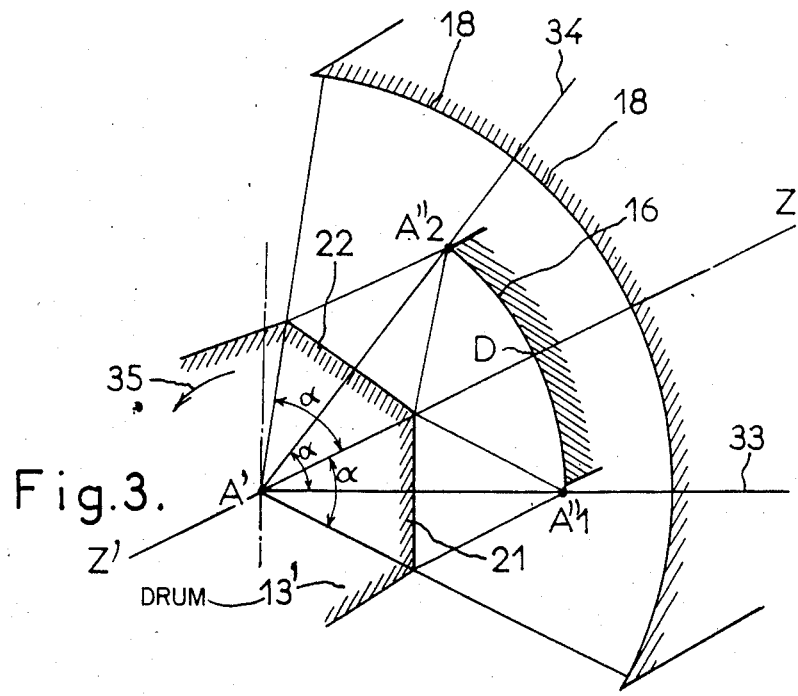
Figure 4:
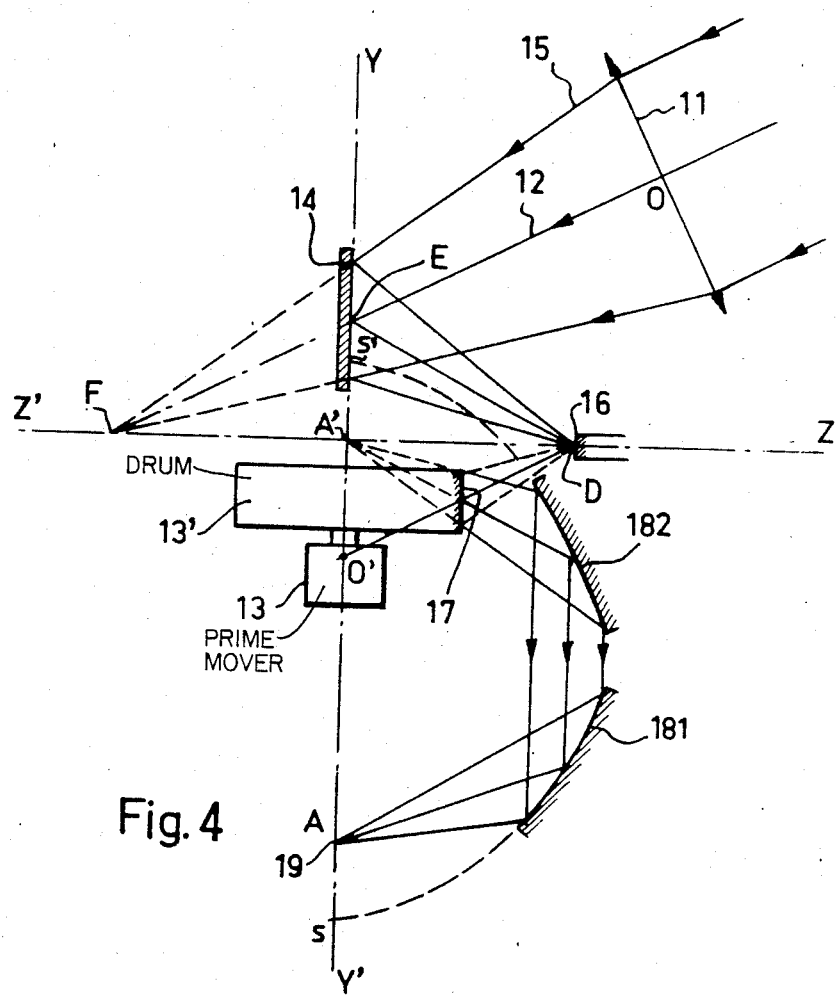
Figure 5:
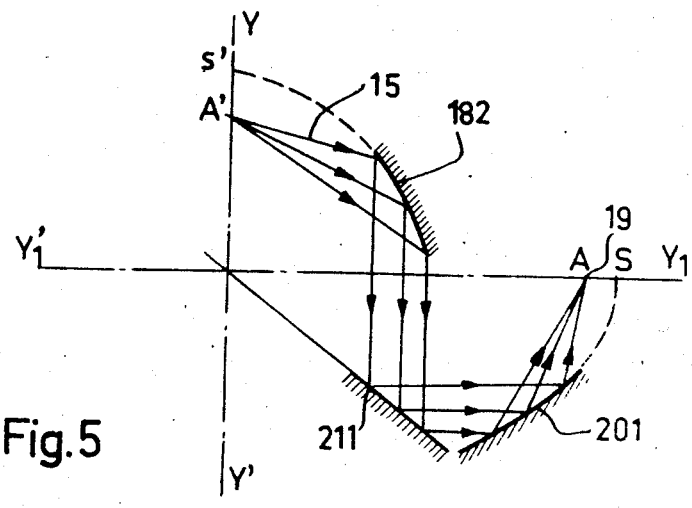
Figure 10:
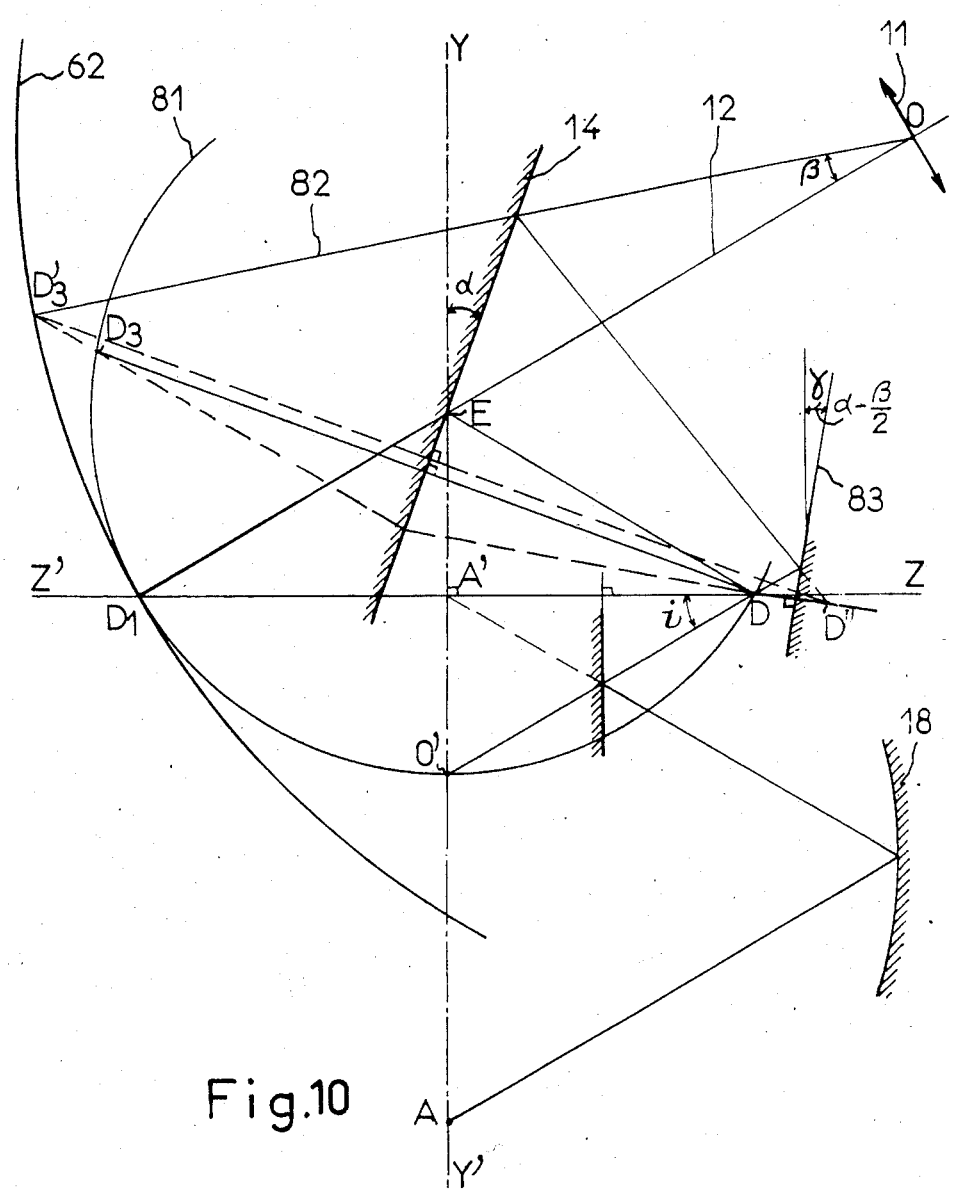
Figure 11:
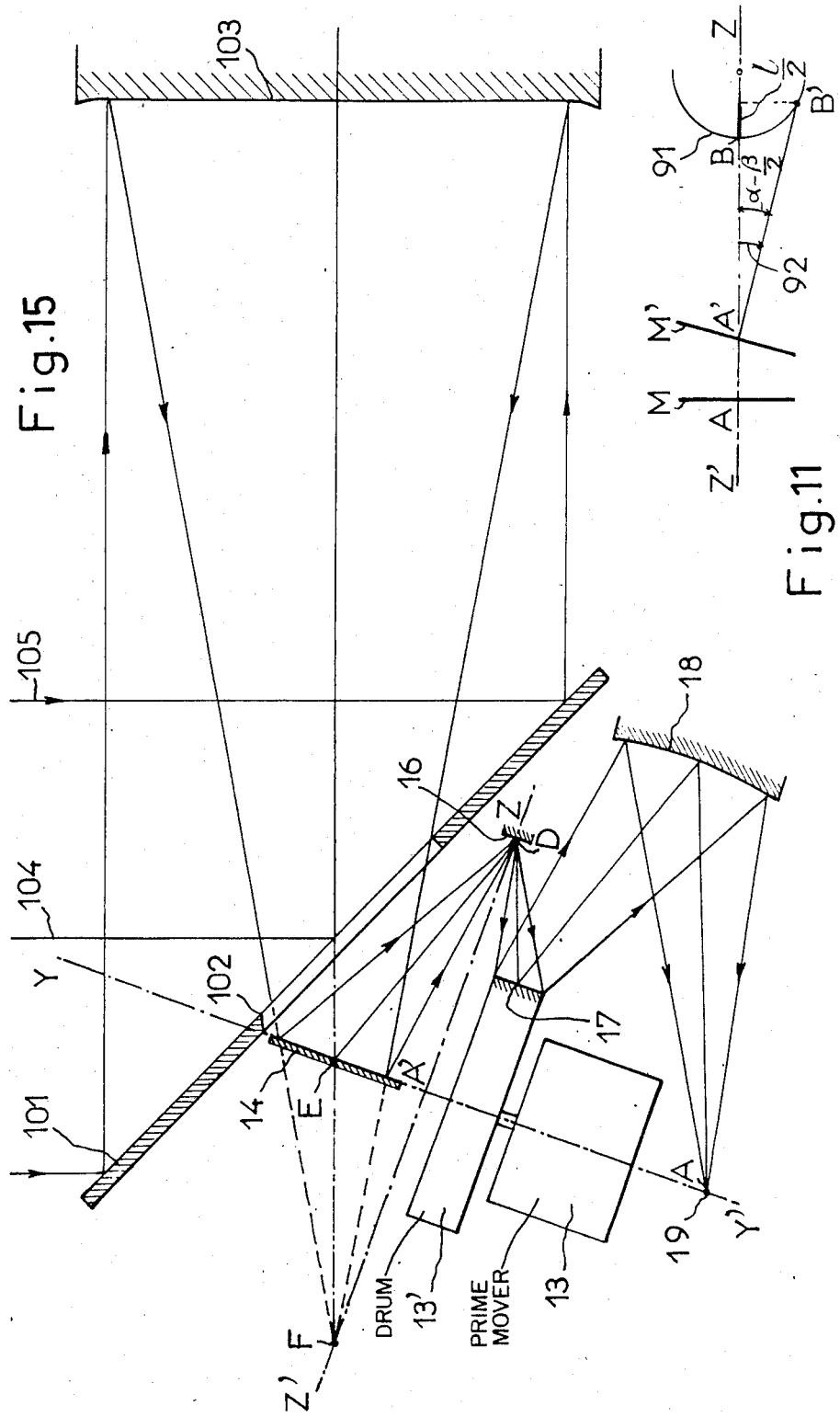
Figure 12:
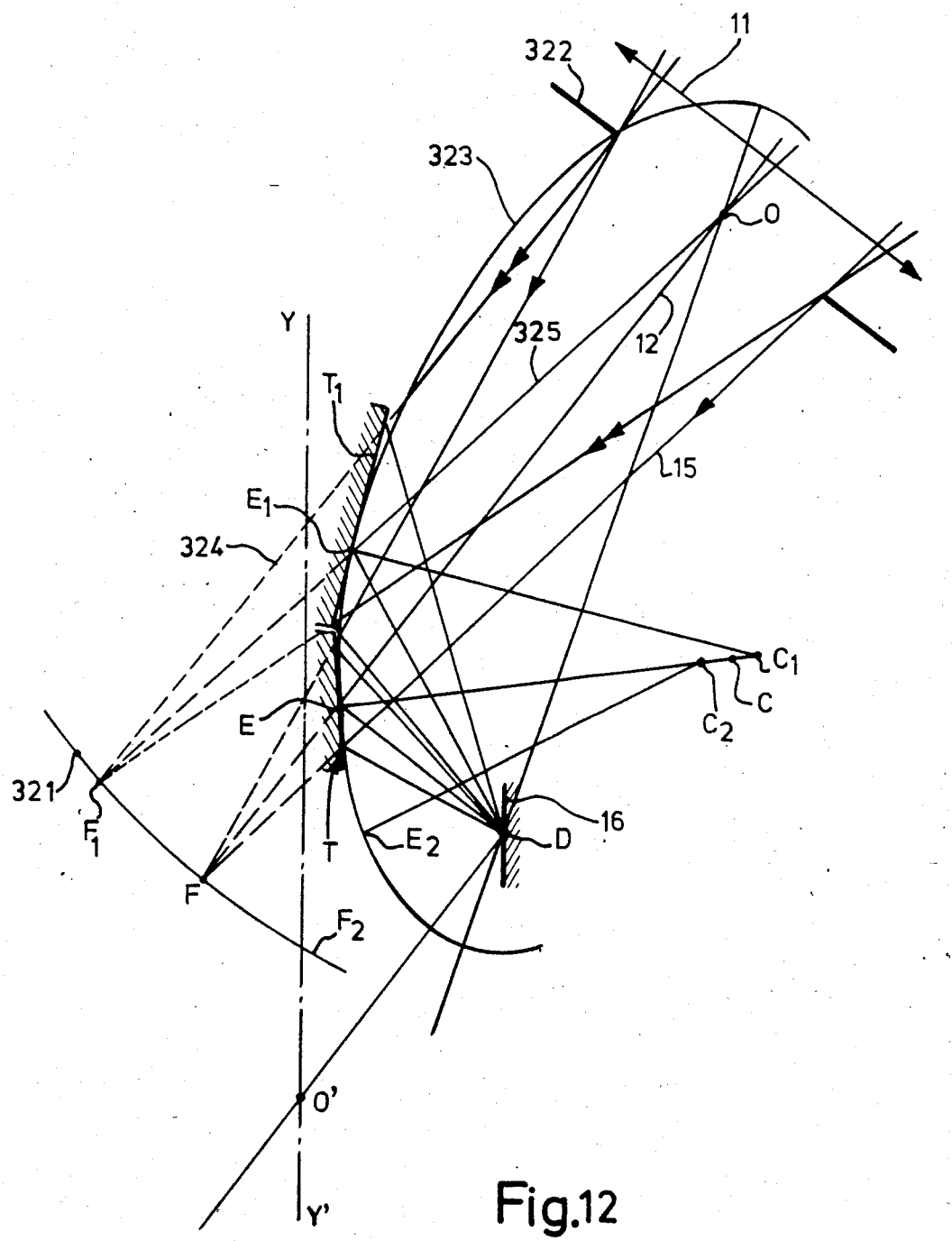
Figure 14:
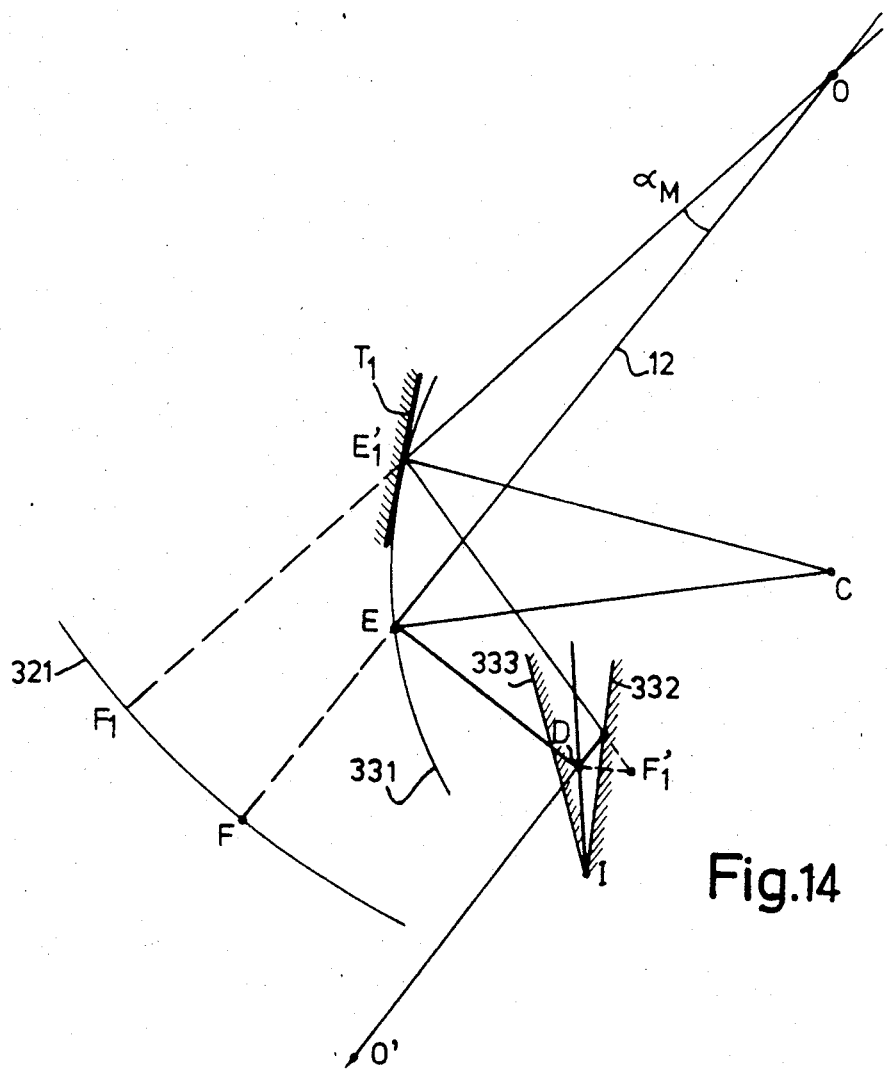
Figure 13:
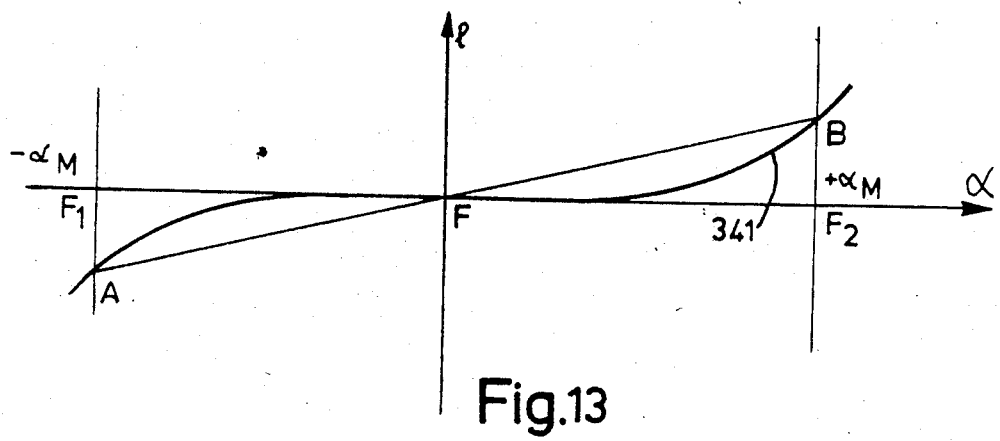
Figure 16:
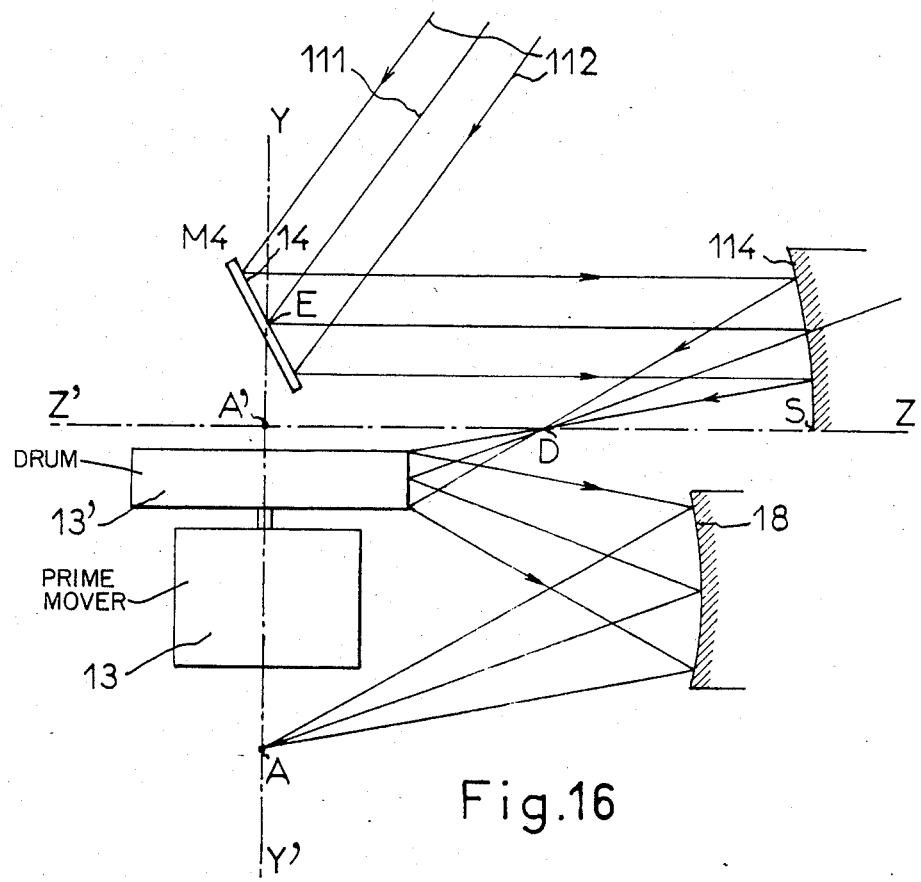
Figure 17:
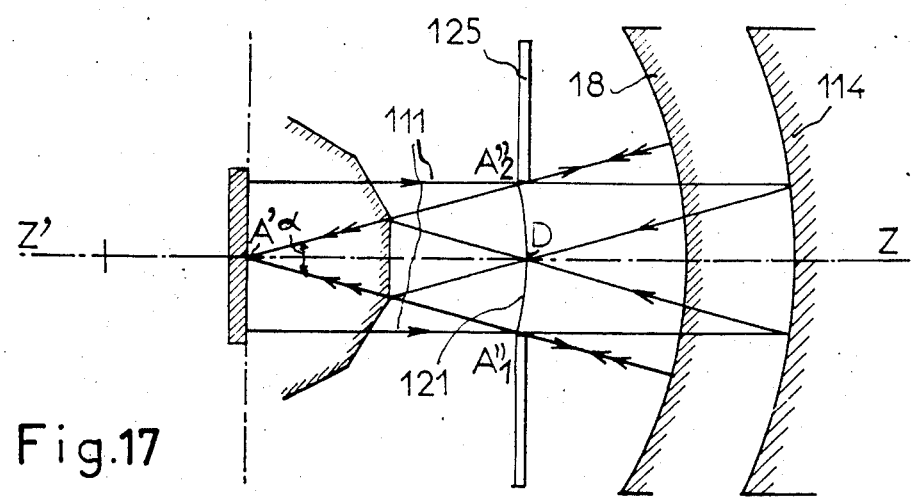
Figure 19:
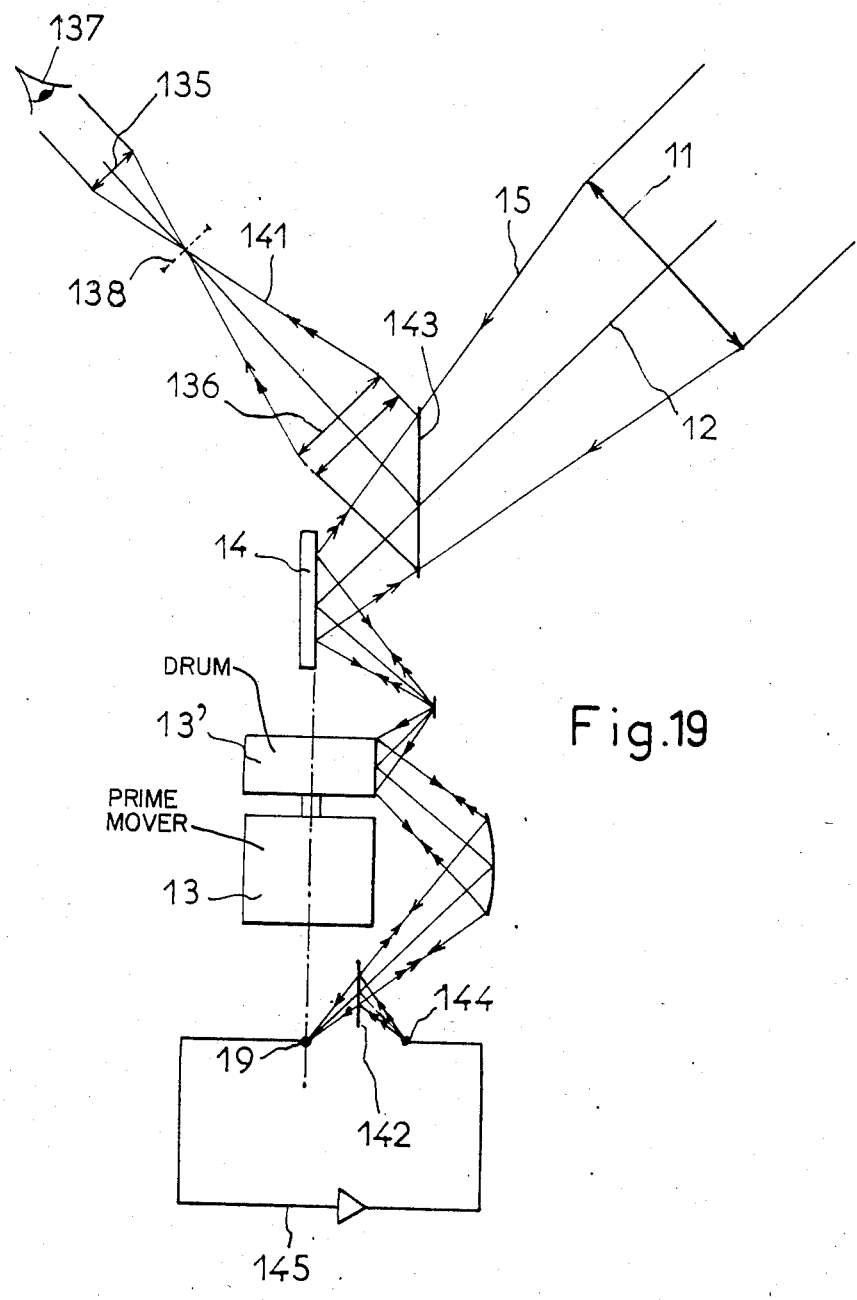
Figure 23:
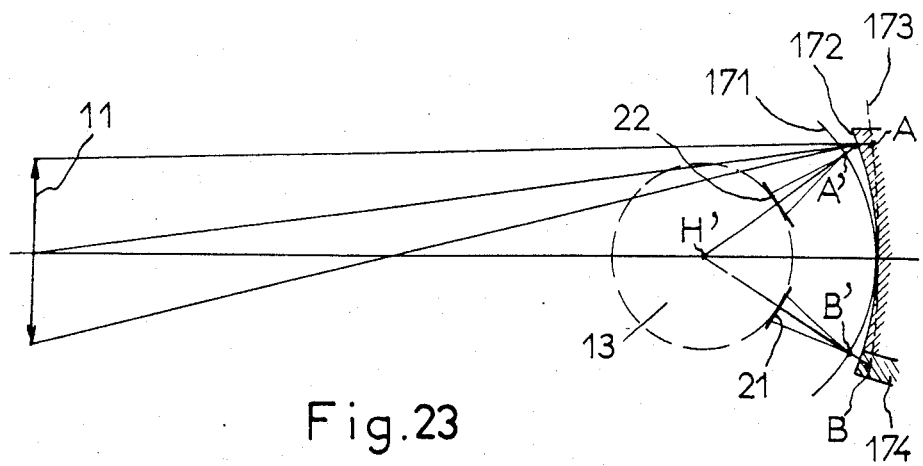
Figure 24:
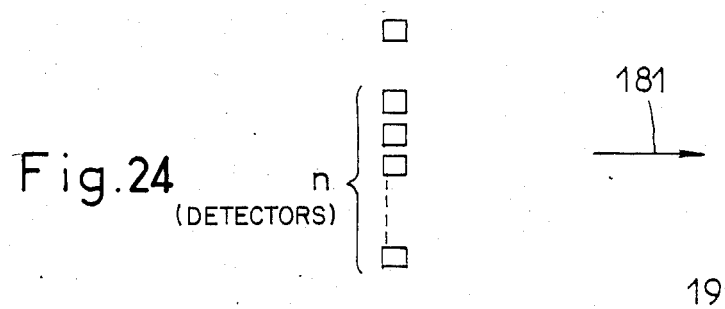
Figure 25:
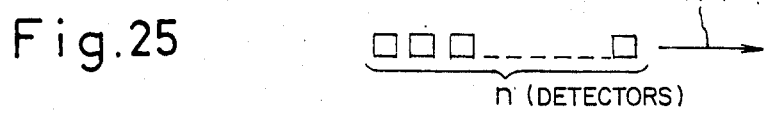
Figure 26:
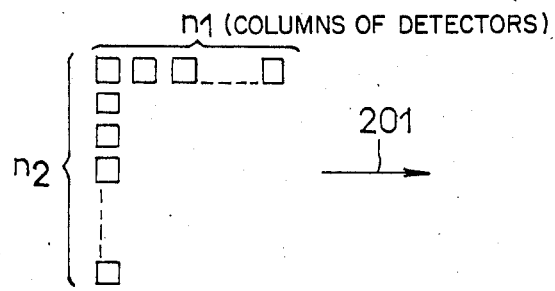

The invention will be better understood from the following description of several methods of realization of the invention presented by way of example, particularly when using the accompanying figures, the titles of which are as follows:

FIG. 1. First embodiment of the device in accordance with the invention, shown in section with respect to its plane of symmetry;

FIG. 2. View of line analysis device using mirrors only, shown in section with respect to a plane passing through its axis of rotation;

FIG. 3. View of same line analysis device, shown as a projection on a plane perpendicular to the axis of rotation;

FIG. 4. Section of the first embodiment with the line scanning mechanism in accordance with the first special form using mirrors only, the sensor being on the axis of rotation of the device;

FIG. 5. Sectional view of the first embodiment with the line scanning mechanism in accordance with a second special form using mirrors only, the sensor being outside the axis of rotation;

FIG. 6. View of line analysis device in accordance with a form using lenses, shown in section with respect to its plane of symmetry;

FIG. 7. View of the same device, shown in the form of a projection on a plane perpendicular to its axis of rotation;

FIG. 8. Diagram showing the part played by the mirror, called the field mirror, in the plane of symmetry of the device;

FIG. 9. Diagram explaining the part played by the mirror in a plane perpendicular to the axis of rotation of the device;

FIG. 10. Diagram explaining the motion of the raster mirror in accordance with the first embodiment of the raster scanning mechanism;

FIG. 11. Motion of the field mirror synchronized with the previous motion of the raster mirror;

FIG. 12. Diagram explaining the motion of the raster mirror when coupled with the field mirror in accordance with an embodiment of the raster scanning mechanism;

FIG. 13. Curve showing defocusing introduced by the raster mirror when this motion takes place;

FIG. 14. Special form of motion of the raster mirror and the field mirror in accordance with the second embodiment of the raster scanning mechanism;

FIG. 15. Second embodiment of the device in accordance with the invention requiring mirrors only, shown in section in accordance with its plane of symmetry;

FIG. 16. A third embodiment of the device in accordance with the invention, shown in section with respect to its plane of symmetry;

FIG. 17. View of the third embodiment, shown as a projection on a plane perpendicular to its axis of rotation;

FIG. 18. Embodiment with first system for direct visual display of image;

FIG. 19. Embodiment with second direct visual display system;

FIG. 20. Embodiment with third direct visual display system;

FIG. 21. Element of invention permitting two-color vision;

FIG. 22. Developed view on the plane of the leaf of element 151 in the preceding figure;

FIG. 23. Embodiment of the invention for thermal imagery with pyrometry;

FIG. 24. Parallel arrangement of the detectors of the device in accordance with the invention;

FIG. 25. Series arrangement of the detectors of the device in accordance with the invention;

FIG. 26. Series-parallel arrangement of the detectors of the device in accordance with the invention.

FIG. 1 is a schematic sectional view of the invention in accordance with one embodiment in the plane of symmetry P of the device. The fixed objective is 11, its optical axis is 12 and F is the focus. This optical axis cuts the YY' axis at point E. The YY' axis is the axis of rotation of a system comprising prime mover 13 and drum 13', the latter having a great many lateral reflecting faces. As discussed hereinafter, this drum can have several shapes. Here, for purposes of simplicity, the drum is taken as prismatic with its reflecting faces regularly spaced about the YY' axis. One such face 17 is shown in a position perpendicular to plane P. Plane mirror 14 is movable about an axis perpendicular to the paper and passing through E although it is not mandatory that this axis pass through E. The arrangement shown in FIG. 1 is preferred only when the device, as will be pointed out later on, is equipped with supplementary mechanisms to obtain a direct visual display of the field with electroluminescent diodes. Mirror 14 reflects any beam emitted from a field zone that passes through objective 11 to mirror 16, where it forms from the field an image that is located approximately on this latter mirror. Special beam 15 shown in FIG. 1 is a beam that has a mean ray merged with optical axis 12, the image forming at point D on the ZZ' axis, which is perpendicular to YY', and corresponding to the center of the field.

Mirror 14 ensures field scanning in the y direction perpendicular to axis 12 and contained in the plane of the figure. This mirror will, in what follows, be called the image analysis mirror, the y analysis mirror or the raster analysis mirror.

The system further comprises another mirror 18 which is fixed and concave, the reflecting surface of which is a surface of revolution about the YY' axis. Mirror 18 forms an image of detector 19, which is placed at point A on the YY' axis at A', A' being located on the same axis and symmetrical with D with respect to face 17.

The system comprised of rotating drum 13', mirror 18 and detector 19 makes it possible to analyze the field image provided by objective 11 and image analysis mirror 14 in the vicinity of point D line by line in the x direction perpendicular to the plane of the paper during rotation of the drum. This system will, in what follows, be called the line analysis system or the x analysis system. Mirror 16, symmetrical with respect to the plane (ZZ', YY') ensures optical conjugation of the center of the exit aperture O of objective 11 with fixed point O' on the YY' axis, symmetrical with E with respect to ZZ', in a manner such as to ensure the convergence on the detector of any beam in the exit aperture of objective 11.

Mirror 16, because it delimits the field analyzed, is called the field mirror.

Objective 11 is shown in this figure as having been realized using lenses. In accordance with the invention, as will be described hereinafter, this objective can also be realized with mirrors. The choice, arrangement, and combination of the elements of which the invention is comprised are as follows:

1. Line analysis system (x).

The first embodiment of this system is shown schematically in FIGS. 2 and 3, which are, respectively, a projection on the plane (ZZ', YY'), and a projection on a plane perpendicular to YY'. This system comprises drum 13', rotating about the YY' axis and having a great many plane reflecting faces, and image transport mirror 18. Mirror 18 ensures transport of the image of the detector A placed on the axis of rotation YY' to point A', also on the YY' axis. The faces of drum 13' are placed in a convergent beam in the image transport path of mirror 18. $A''_1, A''_2, \ldots, A''_n$ are symmetrical with A', respectively, with respect to each of the n faces of the drum, and thus describe arcs of a circle centered on the axis of rotation YY' and contained in planes perpendicular to the YY' axis, the aforesaid arcs of a circle being the carriers of the lines scanned.

The drum can have several configurations. It can be prismatic, its faces all being parallel to the YY' axis and equidistant from it. Points $A''_1, A''_2, \ldots, A''_n$ thus describe the same circle passing through D. This is the case in FIGS. 2 and 3, where $A''_1$ and $A''_2$ are symmetrical with A' with respect to two consecutive faces, 21 and 22.

The same holds true if the drum is pyramidal and if the reflecting faces have an equal inclination on the YY' axis, as indicated in FIGS. 4 and 5. But the drum faces can have unequal inclinations. Points $A''_1, A''_2, \ldots, A''_n$ then describe separate arcs of a circle centered on the YY' axis and contained in planes parallel between them and perpendicular to YY'. The line analysis system then scans the different lines passing in the vicinity of point D from one face to the other.

Image transport mirror 18, for example, is a toric section of the YY' axis. The section of the mirror is elliptical for example, and is part of the ellipsoid of revolution of foci A and A'.

However, it is not mandatory that the torus be an elliptical section. The elliptical shape simply is the best theoretical shape. In certain cases, depending on the applications, it is possible to merge a good approximation of an elliptical section with some other section that deviates but little from the first, and which is easier to realize; a circular section, for example.

FIG. 4 is a variant of this embodiment. The numbers assigned to the elements in FIG. 1 are used in this figure. Mirror 18 is an assembly of parts of two paraboloids of revolution, 181 and 182 about the YY' axis, the reflecting surfaces of which are opposite each other. The vertices of these paraboloids are S and S', respectively and the foci A and A'. They are located on YY'. A' is symmetrical with D with respect to face 17 of the drum. The mirrors 181, 182 form the image of detector 19, placed at A, at A'.

FIG. 5 is still another variant of this toric mirror with the special arrangement of mirrors 181 and 182 as before. The structure of the device as an assembly is not included in FIG. 5. Only those elements needed to describe this variant are represented in section in accordance with the plane of symmetry of the device. Shown are the axis of rotation of the device YY', point A', symmetrical with point D with respect to face 17 of the drum, the portion of paraboloid 182 placed as indicated in FIG. 4; that is, with A' as the focus and its vertex S' on YY'.

Detector 19 is located at point A, exterior to the YY' axis and to paraboloid 182. In accordance with the invention, A and A' are uniquely optically conjugated by mirrors. The first step taken for this purpose is to bend the optical beam and lead it outside paraboloid 182. This bending can be accomplished, for example, by using plane mirror 211, tilted toward the beam of parallel rays reflected by mirror 182, the reflecting surface of which, for example, is perpendicular to the plane of the figure pointing toward point A. A second step is to focus the beam reflected by the plane mirror to point A on detector 19 by using a part of paraboloid 201 that is symmetrical, for example, with respect to the plane of the figure and to the focus and vertex, A and S, respectively. As is the case of FIG. 4, that there is no need for the two paraboloids to be identical. Moreover, FIG. 5 shows the use of a single plane mirror tilted 45° with respect to YY' because A and S are on the $Y_1$, $Y'_1$ axis, perpendicular to YY'. The invention also envisages the use of a bending mirror 211 with a tilt different from 45° with respect to YY' or the use of several mirrors reflecting successively the beam from paraboloid 182 because the axis of paraboloid 201 is not necessarily perpendicular to the YY' axis when the detector is located outside the YY' axis.

One remarkable result obtained by the invention in these latter variants of the line scanning system is that AA" can have any distance, relatively speaking, because the optical path between paraboloids is covered by parallel beams. This makes it possible to move the paraboloids further away, whether or not the detector is on YY'. This is not the case when the image transport from a detector on the YY' axis is by an ellipsoid, because in this latter case the distance AA' must necessarily be the distance between foci. In accordance with the invention, the detector can easily be placed quite far from the YY' axis, in an eminently favorable position, if the detector is integral with the auxiliary mechanisms and has a volume large enough and necessary for it to function. This would be the case, for example, if a cryogenic apparatus were involved.

In accordance with a variant very like this embodiment, the torus is not uniquely mirrors, but catadioptric. The scanner thus loses the advantage of being able to function on all wavelengths because it no longer is comprised uniquely of mirrors. It does, however, offer the advantage of dealing with new parameters to correct aberrations.

In a second embodiment, image transport of a detector on the axis is realized with a lens objective. FIGS. 6 and 7 show this embodiment as projections on a plane containing the YY' axis and on a plane perpendicular to the aforesaid axis, respectively.

The detector is at A, outside the axis of rotation YY'. Objective 41 provides a detector image at A', on the axis of rotation YY'. Drum 13' still can be prismatic, or pyramidal, regular or irregular with respect to YY'. A", which is symmetrical with A' with respect to one of the faces 42 of this drum, still describes the arc of a circle 43 centered on the YY' axis and passing through D, or close to it.

This system has the inconvenience that it cannot be rotated about the YY' axis, so that the A', or A", image is not of constant quality as a function of drum rotation. Moreover, objective 41 must have a very large aperture that is a function of the length of the line analyzed.

This second embodiment can be useful in certain applications. However, the toric mirror system is generally preferred because of the following advantages:

(1) utilization on all light wavelengths, controls and adjustments of possible visible light focusing because the system is comprised entirely of mirrors. It thus is very easy to build;

(2) constant quality image provided by the torus, regardless of the angle of drum rotation, because the YY' axis is an axis of symmetry of the line analysis device.

Numerals 21 and 22 in the horizontal projection of the line scanning system shown in FIG. 3 represent two consecutive reflecting faces of drum 13'. 33 and 34 are the normals to each of these faces (or the projections of these two normals on a plane perpendicular to the YY' axis when the drum is pyramidal. These normals make an angle α.

$A''_1$ and $A''_2$ are symmetrical with image A' of detector A, with respect to faces 21 and 22, respectively. The angle at which mirror 21, or 22, is seen from A' is also α. This angle α fixes the maximum length of the line analyzed carried by the arc of a circle $A''_1 A''_2$ during rotation of drum 13', as well as the aperture mirror 18 must present. As a matter of fact, the detector must not receive flux from two different points on the line simultaneously. The line analyzed must, for this purpose, contain only a single image of the detector. Let us suppose that drum 13' is turning in the direction of arrow 35, and that mirror 22 has begun to scan the line at $A''_1$. The scan must be terminated at $A''_2$ at the moment mirror 21 begins to scan the next line at $A''_1$. the aperture in the toric mirror in the plane perpendicular to YY' must be such as to enable the rays from $A''_1$, or from $A''_2$, to be reflected toward A. One can deduce from this, and as will be seen directly in FIG. 3, that this aperture must be greater than, or equal to, 2α ($\geq 2\alpha$).

Thus, the dead time between scanning of two consecutive lines is zero. The length of the line analyzed is determined by the number of facets of the rotating drum that fix the angle; that is, length $A''_1 A''_2$, in FIG. 3. Moreover, mirror 16 called the field in the description of FIG. 1, intervenes to prevent the flux that falls on the detector from coming from several points on line $A''_1 A''_2$ in FIG. 3, as will be noted hereinafter.

2. Field mirror.

The roles and the configuration of the field mirror (mirror 16, FIG. 1) will be explained with the aid of FIGS. 8 and 9.

FIG. 8 shows the entrance optics as a projection of the device on the plane of symmetry passing through the YY' axis. The image analysis mirror has been omitted so as to avoid cluttering the figure and, as a result, objective 11 is represented in a position that is symmetrical with its true position with respect to the YY' axis. This does not impose limitations on anything that is said in what follows.

O" is the designation of the center of the exit aperture of the objective placed in the aforesaid symmetrical position. Moreover, several right sections of surfaces are shown; that is, the right section of the field mirror, 61, the right section of the focal surface of objective 11 with center at O", 62, the right section of the surface analyzed with center in O' on the YY' axis, 63, and the intersection of a ray OG reflected at G on right section 61 of mirror 16. These right sections intersect at point D on the optical axis of objective 11, which point corresponds to the center of the field.

Field mirror 16 has several roles. It has been conceived to reflect any ray from O" (such as O"G) as a ray (such as O'G) passing through fixed point O' on the YY' axis, the point O' being symmetrical with E, the intersection of the optical axis with YY'. The primary role thus is to conjugate the center of the exit aperture O" of the objective 11 (thus O) with fixed point O' on the axis of rotation, a condition whereby any beam from one of the zones of the field associated with any ray passing through O and picked up by the line analysis mirrors can converge on the detector placed at A on the axis of rotation YY'. The introduction of a mirror such as this has a priori the inconvenience that the mirror has introduced its own field curvature. In point of fact, this is not so, and there thus appears the second role played by the field mirror. In accordance with the invention, the mirror's curvature is used to advantage to correct the effects of aberrations due to the curvature of objective 11 and that of the line analysis system. It provides an image from the focal surface of objective 11 (section 62) that is coincident with the surface analyzed (section 63) centered in O', and which is obtained because the focal surface (section 62) is centered in the exit aperture of objective 11, and because the field mirror optically conjugates O" (thus O) and O'. This field mirror is, in its most theoretical form, a portion of an ellipsoid of revolution with foci O" and O', and containing point D, as well as any point such as G.

A form close to that of an ellipsoid, and such easier to arrive at, will be used in practice, and in accordance with the invention. This form is that of a portion of a sphere passing through D and having as its center point C, which is the intersection of O"O' with the ZZ' axis, perpendicular to YY', and passing through D. Its radius of curvature is such that when projected on a plane perpendicular to YY' at D, the mirror, as shown in FIG. 9, conjugates H and H', the projections of O" and O', respectively, on the plane. The line analyzed is the arc of circle 73, centered at H', the intersection of the plane with the sphere with its center at O' and radius O'D, whereas the right sections of the focal surface of objective 11 and of the mirror are the arcs of circles 72 and 71 respectively.

In accordance with the invention, the field mirror, 16 can be limited to the arc of a circle infinitely small in the YY' direction and centered at H' in the plane perpendicular to YY' and containing ZZ', the circle providing image B' on the arc of circle 73 from point B on 72 corresponding to radius of projection HB.

There can be a case when the arc of the circle can be comparable to a tangent surface. In accordance with the invention, field mirror 16 is therefore a cylindrical mirror, the axis of which is parallel to YY' and passes through C.

A third role played by the field mirror is that of fixing the dimensions of the field analyzed, particularly the length of the line. The maximum length of the line is determined, as has already been seen, by the number of rotating drum facets. It corresponds to arc $A''_1A''_2$, centered in A', and shown in FIG. 3. $A''_1$ and $A''_2$ are the images of the detector provided by the line analysis system with the aid of two consecutive faces of drum 13'. Field mirror 16 has a width less than arc $A''_1A'_2$ such that the flux that falls on A at the detector can come only from a point, and only one point, on the line. One of the sides of the mirror can coincide with $A''_2$, for example, but will be slightly set back with respect to $A''_1$, as shown in FIG. 3.

It is desirable to have the line analysis system transversed by rays with the same incidence, no matter what the direction, for reasons of constancy of quality of the field image as a function of the direction of the field analyzed in the y direction, and equally because of problems relating to the bulkiness of the line analysis system.

The invention ensures this condition by driving the field mirror in a reciprocating motion synchronized with the motion of the image analysis mirror. These motions will be described in the description of the image analysis system that follows.

3. Image analysis system.

FIG. 10 shows this system schematically as a section through the plane (ZZ', YY') in accordance with the first embodiment. Image analysis mirror 14 is rotated in a reciprocating motion about an axis perpendicular to the plane of the figure passing through point E on the optical axis of objective 11. E is shown on the axis of rotation YY' of the x analysis drum. E can, however, have some other position. This mirror generally is placed very close to the focal surface of objective 11 of section 62 in order to reduce the dimensions of this mirror and to permit the use of a high oscillation frequency. This arrangement, moreover, has the advantage of permitting the use of a short focal length objective, and one with a reduced rear segment. D is the image of of detector A in the line analysis system for the center of the field, just as in FIGS. 8 and 9.

Ray OE is merged with the optical axis that passes through D after reflection by mirror 14, when this latter occupies the center of the field analysis position; that is, when it makes an angle α equal to zero with YY'.

As mirror 14 rotates, the point symmetrical with D with respect to this mirror describes an arc 81 of a circle with radius $ED_1$ centered at E, $D_1$ being the point symmetrical with D with respect to YY'. The image of the detector is at $D_3$ on arc 81 for direction 82 of the field making an angle β with optical axis 12, measured from the center O of the exit aperture of the objective, shown in FIG. 10 as merged with objective 11, and corresponding to a position of plane mirror 14 making angle α with YY'. On the other hand, the field image in the β direction is at $D'_3$ on section 62 of the focal surface, or, further, after reflection, at D" on mirror 14, symmetrical with $D'_3$ with respect to the plane of mirror 14.

It thus would appear that if the image of the detector in mirror 14 in a position parallel to YY' is indeed the focal surface of objective 11, the image would be diverged as a function of the field angle β, defocusing appearing as the segment $D_3D'_3$, or as DD", of length 1.

Theory shows that DD" makes an angle $\gamma = \alpha - \beta/2$ with ZZ', whereas the value 1 is given by the relationship:

$$l = -LM + \sqrt{\Delta}$$

where $$L = r\frac{\sin 2\alpha}{\sin \beta}$$

$$M = \cos\left(\alpha + i - \frac{\beta}{2}\right)$$

$$\Delta = L^2(M^2 - 1) + R^2$$

$$\alpha = \frac{1}{2}\left[\beta + \arcsin\left[\left(\frac{R}{r} - 1\right) + \sin \beta\right]\right]$$

$$R = OD_1$$
$$r = ED$$

and in which i is the angle ED makes with ZZ'.

In accordance with the invention, this defocusing is corrected by imparting to the field mirror 16 appropriate small amplitude motions such that the tangent at the vertex of the mirror is the perpendicular bisector of DD" at any instant. These motions can be broken down into (1) a reciprocating motion of translation with amplitude $\frac{1}{2} \cos \gamma$ in the ZZ' direction from Z' to Z, and (2) into a reciprocating rotation of amplitude $\gamma$ about an axis parallel to x and symmetrical with respect to ZZ', the translation and rotation being in phase with the motion of raster mirror 14.

FIG. 10 shows the position of mirror 16 for field angle $\beta$, formed by tangent 83 to the mirror at its vertex, initially perpendicular to ZZ' at D for the center of the field; that is, for $\alpha$ and $\beta$ equal to zero. This tangent is midway from D in the direction of DD", at the same time that it makes an angle with YY' equal to $\alpha - \beta/2$, such that ray OD'$_3$ cuts the ZZ' axis at D after successive reflections by mirror 14 and mirror 16, and passes through point O', which is conjugated with O by mirror 16 in its initial position.

Regardless of the value of $\beta$, D is the image of D" in the field mirror, and the mean ray of the beam after reflection by the mirror presents a constant inclination i to the ZZ' axis such that center O of the exit aperture is unswervingly conjugated with the same fixed point O' on YY'. It follows that for any direction of angle $\beta$ of the field, the focal image of objective 11 in the field mirror is still found merged with the surface analyzed by the line analysis device.

The complex motion of the field mirror is brought about, for example, as shown in FIG. 11. Mirror 16 is mounted perpendicular to a rectilinear support AB such that A is translated along the ZZ' axis, whereas B describes an arc 91 of a circle centered in ZZ' and contained in the plane (ZZ', YY'). M in FIG. 11 is the position of mirror 16 passing through D and corresponding to the center of the field, while M' is the position of the mirror for the direction of a field with angle $\beta$. The support thus occupying position A'B' has turned through an angle $\alpha - \beta/2$ with respect to AB in the direction of arrow 92.

FIG. 12 shows the image analysis system (raster scanning) in accordance with the second embodiment. Once again the objective is 11, its optical axis 12 and its focus F. Curve 321 represents the section of the focal surface of this objective in plane P.

The exit aperture is assumed not to merge with the principal plane of the objective. This aperture is 322, whereas the principal plane is assumed in accordance with 11. The center of this aperture is O. The focal surface seen from O in this example is spherical concave, its center of curvature being O. Curve 321 thus is a circle. Also, once again, in this figure YY' is the axis of rotation of the line scanning mechanism, point D is merged with the detector image provided by the line scanning mechanism when the aforesaid scanning is in the middle of a line. O', on the YY' axis, is a fixed point merged optically with point O by the raster mirror and the field mirror, which later on explains the position and motion. 323 is an ellipse, the foci of which are O and D, respectively, the major axis of which is equal to OF, the radius of curvature at F of the focal surface 321. The raster mirror, the reflecting surface of which is opposite D, moves about, but remains constantly tangent to this ellipse, the point of intersection of this ellipse with the mean ray of the beam analyzed. FIG. 12 shows two such beams. Median beam 15 converges at F, for which the raster mirror is in position T, the point of contact with the ellipse being E, the intersection of 12 with the ellipse. Extreme beam 324 converges at $F_1$ on curve 321, for which the raster mirror is in position $T_1$, the point of contact with the ellipse being $E_1$, the intersection of ray 325 with the ellipse. Points $F_2$ and $E_2$ on 321 and 323, respectively, are points analogous to F and E for the extreme analysis beam symmetrical with 324 with respect to the optical axis. When the raster mirror rolls back and forth on ellipse 323 from $E_1$ to $E_2$ and from $E_2$ to $E_1$ it focuses the beam analyzed at point D, whatever its position on the ellipse. This results in scanning the field in the raster direction with no defocusing at point D. This is the point at which the vertex of concave field mirror 16 is found. Mirror 16 is rotated about an axis perpendicular to P and passing through D in synchronism with the motion of the raster mirror such that the mean ray of the beam analyzed, 12 or 325, for example, is reflected according to fixed radius DO'. Arc $E_1E_2$ of the ellipse used is located near point D and some distance from the minor axis of the ellipse by preference in order to reduce the bulkiness of the raster mirror and reduce its weight.

In practice, motion of the mirror is ensured, for example, by providing two roller-paths with an elliptical section identical with 323, installed in planes parallel to plane P, located in all directions in the aforesaid plane in a manner such that the sections of the aforesaid roller-paths project orthogonally on P following 323, mechanical pressure mechanisms ensuring contact without slippage of the mirror in the rollerpaths.

A special embodiment of the invention concerns the case where the field analyzed is not very large. In this case, arc $F_1F_2$ itself is not very large, and the centers of curvature $C_1$, $C_2$ and C of the ellipse are very close together at $E_1$, $E_2$ and E, respectively. The arc of the ellipse $E_1E_2$, therefore, can be equated to a circle with radius EC, centered at C. In this case, the raster mirror can be made to roll on this circle, a very simple way to realize this motion being that of linking the mirror to an arm of constant length articulated about C. This motion will cause slight defocusing. This defocusing, 1, with respect to D, is shown in FIG. 13 by curve 341 as a function of the angle $\alpha$ the direction analyzed makes with the optical axis of the objective. Both 1 and $\alpha$ are affected by their signs in this figure. They are zero at F, positive in the direction toward point $F_2$ and negative for the direction toward point $F_1$. These defocusings are maximum at points $F_1$ and $F_2$ (points A and B on curve 341). In accordance with the invention, the importance of this defocusing can be reduced by slightly, but adequately, displacing the center of rotation of the field mirror in plane P with respect to point D.

FIG. 14 shows the displacement made to simultaneously cancel defocusing for the direction of the field analyzed corresponding to F, $F_1$ and $F_2$, respectively. Here too the focal curve is 321, the focus is F, and the field image in the extreme analysis direction making an angle $\alpha_M$ with the optical axis 12 on which point E in FIG. 12 is represented, is $F_1$. Center O of the exit aperture, and its conjugate O', are again on the YY' axis. The position of the raster mirror is $T_1$. This mirror describes circle 331 with radius EC. The image of $F_1$ in the raster mirror in position $T_1$ is $F'_1$, and the defocusing introduced thus is $DF'_1$. This defocusing can be canceled by displacing the axis of the field mirror parallel to plane P to point I, the intersection of the exterior bisector of angle EDO', and the perpendicular bisector of the segment $DF'_1$, the axis perpendicular to plane P. The field mirror oscillates about point I on both sides of DI during raster scanning, symmetrically with respect to DI from position 332 to position 333, corresponding to points F₁ and F₂, respectively, of the field image in the objective. The maximum deviations in focusing are thus practically halved, the residual deviations being those that can be measured between curve 341 and straight line AB in FIG. 13.

The invention extends to the case where the focal surface of the objective is spherical convex with respect to incident light and the exit aperture is located behind the focal surface. It also extends to the case where the exit aperture is taken to infinity and the plane focal surface. In accordance with the invention, the mirror rolls over a portion of a hyperbola or of a parabola. In the hyperbola case, the foci of the mirror are once again the center of the objective's exit aperture and point D. In the parabola case, the focus of the mirror is point D, and its axis is parallel to the optical axis of the objective.

In these latter cases, circles tangent to the aforesaid parabola and hyperbola at the point of contact of the raster mirror corresponding to the median direction of the field, and having the same radii of curvature as the parabola and hyperbola, can be used. Measures taken to reduce defocusing thus introduced, measures analogous to those taken for an objective with a concave focal surface, also form part of the invention.

One such compensation for defocusing, introduced by the image analysis mirror 14 makes it possible to obtain a quite good resolution limit over the entire field scanned in x and y, as well as in the center of the field. Moreover, the resolution limit provided by the objective is not changed by the x and y analysis system.

Two other embodiments of the optical-mechanical scanner in which the elements described in detail in the foregoing are combined will now be described by way of example.

One embodiment is shown in FIG. 15 in the system's plane of symmetry.

It has the special feature of being realized entirely with mirrors. The entrance objective comprises reflecting mirror 101 having an aperture 102 and a mirror like a telescope mirror 103 with a parabolic section. 104 is the optical axis of the objective. The focus is at F. A beam from a point at infinity is reflected by fixed mirror 101 and mirror 103, passes through aperture 102, and is then taken over by the analysis system proper, namely, image analysis mirror 14, field mirror 16, rotating drum 13', and image transport mirror 18 causing it to converge at detector 19.

Numeral 105 in FIG. 15 is a beam that has as its mean ray the ray merged with optical axis 104. With telescope mirror 103 taken into consideration, the field is of the order of 0.5° to 3° for example.

The other embodiment is shown in FIGS. 16 and 17 as a section in the plane of symmetry of the device and as a projection on a plane perpendicular to the axis of rotation YY' of the line analysis system, respectively.

This embodiment has the special feature of placing the image analysis mirror 14 upstream from the objective in a parallel beam, the mirror for example, being mobile about one axis perpendicular to the plane of FIG. 16 and passing through point E on the YY' axis on which the detector is at A.

Mirror 14 delimits the beam that enters the system, and can be regarded as the analysis system's entrance aperture, the system having symmetry of revolution about the YY' axis, and therefore identical optical properties in all field directions The objective is a toric mirror 114 with axis YY' and a section that is parabolic for any plane passing through YY'. The focus of the section in the plane of the paper is at point D, the center of the field on the ZZ' axis passing through A' and the image of the detector in the toric line analysis mirror 18. The focal length of mirror 114 is selected equal to the radius of the analysis circle such that A'D=DS, S being the vertex of the section of the torus, the vertex being on ZZ'. Toric mirror 114 is limited by its surface above the ZZ' axis. The locus of the foci is such that D is a circle 121 with radius A'D in the plane perpendicular to YY' and passing through D. These foci are successively merged with the image of the detector in the line analysis system. The arc described by this image is limited at points A"₁ and A"₂, corresponding respectively to the images of the detector on two successive faces of rotating drum 13'.

In this system, the mean ray of the beam of parallel rays analyzed always passes through a point on the arc of circle A"₁A"₂ after reflection by mirrors 14 and 114, the mirrors themselves the conjugates of detector A in the line analysis system. Objective 114 thus acts as the field mirror, coupled with the fact that the YY' axis is an axis of symmetry for the entire optical system. The field is limited by an external diaphragm 125 at A"₁A"₂ in order to prevent the detector from receiving flux from two points in space at the same time.

The field analyzed thus is equal to angle α and only one face of the drum is seen from D (FIG. 17); that is, the angle is on the order of, say 20° to 60°, depending on the number of drum facets.

The device has been described in several special embodiments in which the field analyzed is at infinity. Needless to say, the invention is not limited to these cases, and the field can very well be at a finite distance. As a matter of fact, the line and raster scanning systems are compatible with the use of any kind of small or large field objective sighting at a finite distance, or at infinity, such as, for example, microscope objectives, or variable focal length (zoom) objectives, the resolution obtained always being very high because of the perfect focusing of the image of the detector on the image surface of the objective. Resolution can reach a limit because of diffraction in the totality of the field of the apparatus.

Moreover, it also will be seen that the invention readily lends itself to compact assemblies. But despite the compactness, the structure will be such that the detector will be in a position outside the optical-mechanical analysis system proper, thanks to the obliquity of the beams on the field mirror, and on the line scanning elements.

The invention, complementing the optical-mechanical analysis device just described in detail, comprises devices permitting direct visual display of the objects analyzed. Further, it permits the application of the device to infrared imagery of certain objects, or of those in other wavelength regions.

For the direct visual display, the video signal from the detector is fed into an electroluminescent diode in the visible spectrum after suitable amplification, the luminescence of the diode being proportional to the signal it receives.

The analysis system in the version comprising mirrors only can be used on all wavelengths. The direct vision of the object analyzed thus is made possible by using the same system for analysis and reproduction.

FIG. 18 is an example of the first embodiment of the invention with respect to this visual display. The analysis and visual display beams, 15 and 131, respectively, use different symmetrical paths with respect to a plane containing YY'.

The analysis device is that described in FIG. 1. The visual display device comprises a field mirror 132, symmetrical with respect to YY' and mirror 16. Mirror 132 is not necessarily mobile because the visual display beam can have a smaller aperture than the analysis beam and one to which the eye can accommodate readily in order to compensate for small field curvature.

Image analysis mirror 14 has two reflecting faces, one for analysis, the other for visual display. Mirror 134 is arranged so that the symmetrical point of electroluminescent diode 133 is merged with detector 19. The amplification channel 140 amplifies the video signal from detector 19 and supplies it to diode 133. The field image analyzed is restored by the aforesaid electroluminescent diode, and the analysis system is observed by eye 137 behind the magnifying telescope, represented schematically by optical elements 135 and 136, or directly behind collimator 139.

The telescope has the advantage of being able to rectify the image. It can have attached to it an image intensifier 138, the purpose of which is to increase the luminescent of the image and provide a time constant for screen remanence, thus making visual display more comfortable.

FIG. 19 shows a second embodiment of this invention for this visual display.

In the embodiment, one particularly suited to imagery in a limited region of the spectrum, the analysis and visual display beams 15 and 141, respectively, have common paths, for the most part, thanks to dichroic mirrors 142 and 143. These mirrors have the property of allowing the light of the analysis spectrum to pass, while reflecting the rest of the spectrum. Mirror 142 is arranged such that the point of symmetry of the electroluminescent diode 144 in this mirror is merged with detector 19. The video signal from detector 19 is amplified in the amplification channel 145 and is supplied to diode 144. Mirrors 142 and 143 reflect toward the telescope comprised of optical elements 135 and 136, and toward the eye 137. The light is emitted by electroluminescent diode 144, and is not included in the analysis spectrum.

Each of the two mirrors 142 and 143 can be made to advantage with one sheet of germanium when analysis is made in the infrared, because they then will pass the infrared and reflect the visible beam coming from electroluminescent diode 144.

Arrangements such as these are not suited to the case when the analysis and visual display system is an auxiliary means, the purpose of which is to improve direct vision of objects in a given forward direction, without recourse to scanning. This vision is brought about, for example, in the visible region of the spectrum when the anticipated result of optical-mechanical scanning is to have the infrared image in the same direction, this image making the direct image in the visible region more specific. It therefore is desirable to superpose the two images. The fact that the mean directions of the field analyzed and of direct visual display are not merged, coupled with the fact that the images obtained are not seen with the same magnification, prohibits their superposition. The same inconveniences appear when the optical-mechanical scanning system must operate to make a point in the mean direction of the field analyzed. It is, in point of fact, necessary that the direction of sight, and the scene analyzed, coincide. In accordance with a third embodiment, the present invention takes appropriate measures to do away with these inconveniences and inadequacies.

The first such measure is to provide the optical-mechanical analysis and visual display device with a magnification of $M = +1$.

A second measure to bend the beam from the visual display part of this device so as to make it parallel to the mean direction of the field analyzed.

A third measure is to provide the device with a telescope operating in the visible region of the spectrum, its axis parallel to the mean analysis direction, giving a direct image in the visible region of the field analyzed and an image of the same field from the optical-mechanical scanning system, the images being superposed in the telescope.

FIG. 20 shows this embodiment schematically as a section through its plane of symmetry. Once again 11 is the entrance objective, functioning in the infrared, the optical axis of which is XX'. Attached to this objective is plane dichroic mirror 212, reflecting infrared, but transparent to the visible. This mirror, tilted 45° with respect to XX', for example, focuses the beam to be analyzed on raster mirror 14, which is movable about an axis perpendicular to the plane of the figure, represented here as cutting the axis of rotation of the device, YY' at E. This position, as has already been pointed out, is only preferential, and can just as well be some other position. The line analysis drum once again is 13 in this figure, the drive motor in the system that rotates about the YY' axis is 13', and the field mirror is 16. The mechanism for transporting the image of detector 19 at A, exterior to the YY' axis, to A' on the YY' axis is that already described; that is, it is comprised of (1) two mirrors 181 and 182 the reflecting surfaces of which are parts of a paraboloid of revolution of YY' and which are opposite each other and (2) dichroic mirror 213 which reflect infrared and are transparent to visible light, are parallel to YY' and are such that detector 19 and electroluminescent diode 220 on YY', for example, are symmetrical with respect to this mirror. Image A' is symmetrical with D with respect to mirror 17 and is itself the image of the focus of objective 11 in mirror 212 and raster mirror 14 in a position parallel to YY'. Numeral 221 is the optical path of the mean ray of the field analyzed merged with the optical axis of the objective functioning in the infrared. This optical path is followed in the opposite direction for visual display because diode 220 is excited by the video signal from infrared detector 19. The beam, after reflection by raster mirror 14 and passage through dichroic mirror 212, is picked up by objective 222 functioning in the visible with the same focal length as infrared objective 11, and the axis and focus of which are symmetrical respectively with the axis and focus of the aforesaid objective 11 with respect to mirror 212. The optical axis of objective 222 thus will be found to merge with the mean direction of the opposite path of the beam 221 just as if it had imparted to the optical-mechanical visual display device magnification M with absolute value 1. The beam, upon leaving objective 222, is picked up and guided into telescope 223, with objective and ocular 229 and 230 respectively, the axis of which $X_2X'_2$ is parallel to XX' (or more simply, to the eye). This is done by bending the beam in succession with mirror 224, an Amici reflecting prism 225 with edge 226 and plate 227 which may be semitransparent or dichroic, these latter two elements being oriented such that the edge 226 is normal to the plate 227. As a matter of preference, 226 and 227 are integral. They comprise a trirectangular trihedral, the position of which has no influence on the direction of the beam at the exit of the optical-mechanical vision device. This beam exits in a direction parallel to XX' merged with the direction $X_2X'_2$ of telescope 223. Moreover, because of the differences in reflections, the image is straightened out and the device acquires magnification $M = +1$. Needless to say, there are different variants of this embodiment. Specifically, the dichroic mirrors could transmit the infrared and reflect the visible; it thus would suffice to reverse the respective positions of element 19 and diode 220. Also, the chain of elements for bending the visual display beam and for straightening out the image could be in some other order. In addition, other optical elements could be selected and the $X_2X'_2$ axis could be translated outside the plane of the figure.

Another modification of the field image is that which uses a cathode ray tube supplied with a video signal from the detector, line and raster scanning of the aforesaid cathode ray tube being synchronized with line and raster scanning of the optical-mechanical device.

The device the subject of this invention is made up only of mirrors when the entrance objective (11 in FIG. 1) is an objective comprised of mirrors. It thus can be used for imageries on any wavelength. It can provide "bicolor" or "multicolor" imageries, and can be used in the spectrum of the ultraviolets as well as in the visible or infrared.

In accordance with the invention, analysis can be simultaneous for the different colors, or can be in sequence for each of the colors. The device for analyzing different colors simultaneously comprises, for example, several detectors, $D_1, D_2, \ldots, D_n$ in the same Dewar vessel, with number n sensitive respectively to wavelengths $\lambda_1, \lambda_2, \ldots, \lambda_n$, and disposed in a single row in the direction of the line analysis. These detectors supply a set of signals $S_1, S_2, \ldots S_n$, each signal out of phase with the other. These signals are brought into phase with delay lines. Images on wavelengths $\lambda_1, \lambda_2, \ldots, \lambda_n$ are, therefore exactly superposable Appropriate electronic processing, using known state of the art devices, makes it possible to derive different signals between images on different wavelengths in sums or differences such as, for example $(S_1 = S_3) - (S_2 + S_n)$ The detectors could be placed in different Dewar vessels in another modification for obtaining simultaneous analysis of several colors. For example, to make a "bicolor" analysis on wavelengths $\lambda_1$ and $\lambda_2$, two detectors $D_1$ and $D_2$ in two different Dewar vessels can be disposed symmetrically with respect to a dichroic mirror. Referring to FIG. 19, detector 19 and diode 144 are symmetrical with respect to dichroic mirror 142, the dichroic mirror passing, for example, wavelength $\lambda_1$ and reflecting wavelength $\lambda_2$.

FIG. 21 shows one embodiment of the invention for performing a sequential type color analysis in two colors. Two detectors, $D_1$ and $D_2$, sensitive respectively to wavelengths $\lambda_1$ and $\lambda_2$, are symmetrical with respect to a rotating disk 151 shown with its plane perpendicular to the paper and parallel to the axis of rotation YY'. This disk rotates about axis 152, the faces of the disk being reflecting and slotted. FIG. 22 is a plan view of the disk, the reflecting part of the face being hatched and slots being shown in white and numbered 161 and 162. Disk rotation is synchronized with image scanning. $D_1$ and $D_2$ alternately receive the flux that passes through the imagery system as the disk rotates, thus making "bicolor" analysis possible. The device can, in this form of the invention also have another radiation source, 153 placed such that its mean emission ray has an inclination on disk 151 symmetrical with the mean ray of the line analysis beam from mirror 18 and passing through $D_1$ or $D_2$. This flux source is seen alternately by $D_1$ and $D_2$, and serves as the reference flux for the flux to be analyzed.

The device in accordance with the invention is particularly suited to obtaining thermal imagery with absolute temperature measurement. One example of the application in this field of a device in accordance with the invention is shown in FIG. 23. Scanning along a line is shown in this figure as a projection on a plane perpendicular to YY'. During scanning, the image of the detector in the analysis system describes the arc of a circle 171 centered on the analysis drum's axis of rotation, which center is projected in FIG. 23 to H'. The extremities of this arc are A' and B' and correspond, respectively, to points A and B of the image field located in the right section 173 of the objective's focal surface. It will be recalled that section 172 of the field mirror has, in particular, the role of conjugating A and A', on the one hand, and B and B', on the other. When the detector receives the flux corresponding to field point A at A', it interrupts the field mirror at B' in a manner such that the detector no longer receives flux from point B, but instead that from small reference source 174, located at the site of the field mirror. As has already been seen, the total length of the field mirror and reference source must be slightly less than the length of the analysis line. There is, therefore, a reference signal at the beginning or at the end of each line that can be temperature calibrated, and to which the signal from the detector can be compared.

The advantage of this system is that the reference source is seen at each image line. The reference signal only lasts for what is equivalent to a few analysis points, and does not distrub field analysis. The reference source is small. It can be a black body, for example, with an emission surface less than one millimeter square. It is possible to cause the temperature to vary rapidly, and to monitor the temperature at any instant with conventional measuring devices (such as a thermocouple, for example). The device of the invention is compatible with the utilization of detectors of any type, cooled or not.

The detection system can comprise a single detector, but it also can be comprised of n detectors arranged parallel to each other in a column (called a parallel arrangement). FIG. 24 shows this arrangement. The small quadrilaterals are detectors, and arrow 181 is the orientation and direction of line scanning, which is performed perpendicular to the column of detectors. The image of these detectors in the line analysis system scans n field lines at one time. The image analysis system shifts line scanning n lines in the following line scan, making it possible to reduce the rate of rotation of the rotating drum. Given a number equal to the lines per second, the rotation rate is n times smaller than for a single detector. This system requires n channels to amplify the signal detected, with one channel connected to one detector. The detection system also can be ensured by arranging n detectors one after the other in the line scanning direction (called a series arrangement). FIG. 25 shows this arrangement. Here arrow 191 indicates the scanning orientation and direction. Each image from a detector in the line scanning system scans the same line and provides a signal for each point on the line, such signal being delayed in time with respect to the signal provided by the other detectors for the same point. Delay lines bring these signals into phase so as to obtain, finally, just one signal supplied to just one amplification channel. The end result therefore is the same as if a single detector with improved sensitivity in a ratio equal to $\sqrt{n}$ been used.

The detection system can also be of the seriesparallel type, that is, one comprising $n_1$ columns of detectors arranged in $n_2$ lines, as shown in FIG. 26. Line scanning is along arrow 201. The rate of rotation of the rotating drum (13' in the figure) thus can be divided by $n_2$ with an improved sensitivity in the ratio $\sqrt{n_1}$.

There can be an assembly of n diodes identical with the assembly of n detectors when the image is restored by electroluminescent diodes. Further, color restoration can be obtained directly by supplying video signals from detectors sensitive to different wavelengths to diodes for different colors.

The same arrangements, series, parallel or seriesparallel can be used for detectors sensitive to different wavelengths in the case of multicolor analysis.

The scanner in accordance with the invention, with its large field, is compatible with conventional high definition television standards, those with 625 lines per image, for example. One such standard corresponds to scanning 625 lines 25 times per second, thus realizing the scanning of 15,625 lines per second. The device in accordance with the invention thus can be comprised, for example, of a rotating drum with 12 faces and a detector comprising 5 elements in parallel. 60 lines (5×12) are analyzed per revolution of the drum. Drum rotation at the rate of 15,625 rpm ensures line scanning of the image at the same frequency as that of the standard 625 line television considered.

What is claimed is:

1. Apparatus for the optical scanning of a field of vision divided into different zones and for the visual display of said field, said scanning consisting of line scanning in an x direction and raster scanning in a y direction perpendicular to said x direction, said apparatus comprising a detector and performing said scanning according to beams from different zones of said field and ensuring convergence of said beams on said detector, said detector comprising an element sensitive to the radiation contained in said beams, said apparatus further comprising in order in the direction of the path of the median incident beam emitted from said field:

an interchangeable objective having its optical axis in a plane P containing said y direction and having a curved focal surface, the center of curvature of said focal surface being located in the center of the exit aperture of said objective;

a raster scanning mechanism including a plane raster mirror rotatable with a reciprocating motion about an axis parallel to said x direction, said mirror being located in a convergent beam behind the objective near the field image in said objective;

a beam deflection system comprising a concave field mirror having said plane P as its plane of symmetry, the vertex of which is in the vicinity of a point D on a ZZ' axis passing through D and perpendicular to a YY' axis, said mirror conjugating the center O of the exit aperture of said objective with a fixed point O' on said YY' axis, said point O' being symmetrical with respect to the point of intersection at the ZZ' axis of the optical axis of the objective and the YY' axis, said mirror being drivable with a small amplitude reciprocating motion in phase with the movement of said raster scanning mechanism, said small motion correcting defocusing introduced by said raster scanning mechanism and ensuring the fixing at O' of the center O of the exit aperture of said objective, conjugated by said field mirror, upon reciprocating rotation of said raster scanning mechanism; and a line scanning mechanism including a drum rotatable about said axis YY' contained in said plane P, said drum having a large number of plane reflecting faces regularly spaced about the circumference thereof, and an image transport system symmetrical with respect to said plane for forming a virtual image of said sensitive element at a fixed point A' on the axis of rotation YY' of said drum, said drum being placed in a convergent beam in the path of the said transport system on the side facing the image of said sensitive element, the point of symmetry of said point A' with respect to each face of said drum being in the vicinity of point D, the point of symmetry of the focus of the objective with respect to the raster mirror in a position parallel to YY', when said face is perpendicular to plane P, said field mirror nullifying scanning dead time between two consecutive lines having at least one width in the x direction slightly less than the length of the line analyzed and having a width equal to the distance between the images of said sensitive element in two consecutive faces of said rotating drum, said beam rotation system being delimited by the aperture in said objective toward said mechanism for line scanning the image field of said objective in the x direction.

2. A device in accordance with claim 1 wherein the axis of rotation of said raster mirror is fixed, and wherein the small amplitude motion of said field mirror permits reciprocating translation along said ZZ' axis in the vicinity of D and reciprocating rotation about an axis parallel to the x direction symmetrical with respect to the ZZ' axis, the amplitude of said translation being such that it corrects defocusing introduced by said raster scanning mechanism, the amplitude of the aforesaid rotation being such that it ensures the fixing at O' of the center O of exit aperture of said objective, conjugated by said field mirror, upon reciprocating rotation of said raster scanning mechanism.

3. A device in accordance with claim 1, wherein the focal surface of the objective is concave with respect to incident light, said raster mirror is rotatable with a reciprocating motion while remaining tangent to part of an ellipse in said plane P, the major axis of said ellipse being equal to the radius of curvature of the focal surface of said objective, one of its foci being occupied by the center of the exit aperture of said objective and the other foci by said point D, the motion of said field mirror being a reciprocating rotational motion about an axis passing through point D parallel to x, said rotation being synchronized with the motion of said raster mirror and the mean ray of the beam being reflected along fixed direction DO'.

4. A device in accordance with claim 3, wherein the part of the ellipse utilized is located principally on the half of the ellipse limited by its minor axis, and which is closest to said point D.

5. A device in accordance with claim 3, wherein the focal surface of said objective is convex and the exit aperture of said objective is downstream from the focal surface, the raster mirror rolling over a part of a hyperbola, the foci of which are occupied by the center of the exit aperture of said objective and by point D, respectively.

6. A device in accordance with claim 3 wherein said device is provided with roller-paths that are, in section, identical with the conical curve described by said raster mirror, said roller-paths being installed on both sides of plane P and parallel to said plane, said raster mirror rolling over said roller-paths.

7. A device in accordance with claim 3, wherein the curve that includes the mirror is a circle adjacent said ellipse, said circle being tangent to the ellipse at a point of contact corresponding to the center of the field analyzed, the center and radius of curvature of said circle being the center and radius of curvature of the ellipse, respectively at the aforesaid point of contact, the slight defocusing introduced being reduced by a slight translation parallel to plane P of the axis of rotation of said field mirror.

8. A device in accordance with claim 7, wherein the axis of rotation of said field mirror is displaced parallel to plane P to the point of intersection of the exterior bisector of angle EDO' and the perpendicular bisector of straight line segment $DF'_1$, E being the point of contact between said raster mirror and its described circle corresponding to the middle of the field analyzed, and $F_1$ being the field image provided by said objective and said raster mirror for one of the extreme directions of the field analyzed.

9. A device in accordance with claim 7 wherein said raster mirror is firmly secured to an arm of constant length, articulated about an axis passing through the center of the described circle.

10. A device in accordance with claim 3, wherein the exit aperture of the objective is at infinity and at its plane focal surface, said mirror rolling over a part of a parabola of the axis parallel to the optical axis of said objective and the focus occupied by point D.

11. A device in accordance with claim 10, wherein the curve described by said raster mirror is a circle approximating a parabola, said circle being tangent to the said parabola at the point of contact between said raster mirror and its described curve, the center and radius of curvature of which are the center and radius of curvature of said parabola at said point of contact, respectively, the slight defocusing introduced being reduced by a slight translation of the axis of rotation of said field mirror parallel to plane P.

12. A device in accordance with claim 10, wherein the curve described by said raster mirror is a circle approximating a hyperbola, said circle being tangent to the said hyperbola at the point of contact between said raster mirror and its described curve, the center and radius of curvature of which are the center and radius of curvature of said hyperbola at said point of contact, respectively, the slight defocusing introduced being reduced by a slight translation of the axis of rotation of said field mirror parallel to plane P.

13. A device in accordance with claim 1 wherein said rotating drum is a prism, the faces of which are reflecting and equidistant from the YY' axis and A' and D are strictly symmetrical with respect to each of the faces positioned successively perpendicular to plane P.

14. A device in accordance with claim 1 wherein said rotating drum is a pyramid, the faces of which have the inclination with respect to the YY' axis and A' and D are strictly symmetrical with respect to each of the faces positioned successively perpendicular to plane P.

15. A device in accordance with claim 1 wherein said rotating drum is a pyramid, the reflecting faces of which are not equally inclined with respect to the YY' axis.

16. A device in accordance with claim 1 wherein the image transport system of said line scanning mechanism is comprised of a toric concave mirror with axis YY', said toric mirror having a plane perpendicular to axis YY' as the plane of symmetry, said sensitive element and its virtual image A' in the aforesaid mirror being located on axis YY'.

17. A device in accordance with claim 16, wherein the section of said toric mirror through a plane containing axis YY' is an ellipse, the major axis of which is merged with YY', one of the foci of said ellipse being occupied by said sensitive element.

18. A device in accordance with claim 17, wherein said section is substantially circular.

19. A device in accordance with claim 1 wherein said image transport system of a detector on the YY' axis is comprised of two concave mirrors in the form of parts of paraboloids of revolution having a common axis YY', the reflecting surfaces of said paraboloids being opposite each other, the focus of one being in point A' and the focus of the other being occupied by said sensitive element.

20. A device in accordance with claim 1 wherein the image transport system of said line scanning mechanism is a catadiopter which is torus-shaped about the YY' axis, said catadiopter having a plane perpendicular to YY' as the plane of symmetry, said sensitive element and the image thereof being on the YY' axis.

21. A device in accordance with claim 1 wherein the image transport system of a detector not located on the YY' axis is comprised of two concave mirrors in the form of parts of paraboloids of revolution, one of said mirrors having YY' as the axis of symmetry and A' as a focus, said sensitive element being in the focus of the other of said mirrors, a system of plane mirrors assuring the transmission of the beam in parallel light from one paraboloid to the other.

22. A device in accordance with claim 1 wherein the image transport system of said line analysis mechanism is a lens objective, said sensitive element is not on the YY' axis, the focal length of the lens objective being such that it forms virtual image A' of said sensitive element on the YY' axis at point D.

23. A device in accordance with claim 1 wherein said field mirror is part of an ellipsoid with foci O' and O", O" being symmetrical with O with respect to said raster mirror in a position parallel to YY', said ellipsoid passing approximately through D.

24. A device in accordance with claim 1 wherein said field mirror is part of a sphere, the center of which is point C, the intersection of the straight line joining points O'O" and ZZ', said sphere passing approximately through D.

25. A device in accordance with claim 1 wherein the amplitude of the translation of said field mirror on the ZZ' axis and that of rotation about the x direction, evaluated from the reference position corresponding to the case in which said field mirror has its vertex in D, the raster mirror is parallel to YY' and the field angle is zero, are $\frac{1}{2} \cos \gamma$ and $\gamma = \alpha - \beta/2$, respectively, where $\alpha$ is the angle the raster mirror makes with YY' and $\beta$ is the angle at which the edge of the field is seen from the center of the exit aperture of the objective, 1, $\alpha$ and $\beta$ being defined by the following relationships:

$$l = -LM + \sqrt{\Delta}$$

with $$L = r\frac{\sin 2\alpha}{\sin \beta}$$

$$M = \cos\left(\alpha + i - \frac{\beta}{2}\right)$$

$$\Delta = L^2(M^2 - 1) + R^2$$

$$\alpha = \frac{1}{2}\left[\beta + \arcsin\left[\frac{R}{r} - 1\right) + \sin \beta\right]\right]$$

$$R = CD_1$$
$$r = ED$$

$D_1$ is symmetrical with D with respect to YY';
E is the intersection of the optical axis of the objective with YY'; and
i is the angle ED makes with ZZ'.

26. A device in accordance with claim 1, wherein said objective comprises a plurality of lenses.

27. A device in accordance with claim 1, wherein said objective comprises a plurality of mirrors only.

28. A device in accordance with claim 27 wherein said raster scanning mirror is located in a parallel beam in front of said objective, its axis of rotation being perpendicular to the YY' axis and cutting said axis, said objective also performing the function of a field mirror and being comprised of a fixed concave mirror toric in shape with respect to axis YY' and having a parabolic section through any plane passing through said axis, the foci of said sections being the conjugates of the detector in said line analysis system, said fixed mirror being limited in dimension in the raster orientation at the portion above a plane perpendicular to the YY' axis and passing through the line of said foci, and a field diaphragm placed on the focal surface of said mirror and limiting the length of the line analyzed.

29. A device in accordance with claim 28, wherein said system for direct visual display of the field image comprises optial elements symmetrical with respect to the axis of rotation of line scanning of those forming said analysis system, said direct visual display system comprising, a plane mirror in which an electroluminescent diode emitting in the visible region is symmetrical with said detector, and means for applying the signal from said detector to said electroluminescent diode, the aforesaid field image being seen by eye with or without the aid of a telescope.

30. A device in accordance with claim 28 wherein the optical elements of said image analysis system are common to the optical elements of the visual display system which comprises, in addition, two plane dichroic mirrors, one of said dichroic mirror being placed such that said electroluminescent diode is symmetrical with respect to said detector and the other dichroic mirror is placed upstream from the line and raster analysis systems, said dichroic mirrors being transparent to analysis light and reflecting electroluminescent light, the image being observed by eye with, or without, the aid of a telescope.

31. A device in accordance with claim 30, which further comprises a reference radiation source placed in the path of the image line from the detector to the end of an analysis line.

32. A device in accordance with claim 30, wherein said detector comprises several sensitive elements arranged in a column perpendicular to the direction of line scanning.

33. A device in accordance with claim 30, wherein said detector comprises several sensitive elements arranged sequentially in a row parallel to the direction of line scanning.

34. A device in accordance with claim 30, wherein said detector comprises several columns of sensitive elements arranged in several rows perpendicular to said columns, said detectors being arranged perpendicular to the aforesaid columns arranged perpendicular to the direction of line scanning.

35. A device in accordance with claim 30, wherein said said sensitive elements are each sensitive to a predetermined band of wavelengths.

36. A device in accordance with claim 30, wherein said objective is a scanning analysis objective for transmitting infrared radiation, said drum is symmetrical with said point A' with respect to each face of said drum when said face is perpendicular to plane P in the vicinity of point D, the image of the focus of the scanning analysis objective in said first dichroic mirror being obtained, said point O' is symmetrical with the point of intersection with the YY' axis of the conjugate of the optical axis of said objective in said first dichroic mirror with respect to ZZ', the small amplitude motion of said field mirror comprises a reciprocating translation along the ZZ' axis in the vicinity of D and a reciprocating rotation about an axis parallel to the x direction, symmetrical with respect to ZZ', the amplitude of said translation correcting defocusing introduced by the raster scanning mechanism and the amplitude of said rotation assuring the fixing at O' of the conjugation by said field mirror of center O of the exit aperture of the scanning analysis objective during reciprocating rotation of said raster scan mechanism, the optical elements in the image analysis system being common to the optical elements in the visual display system and comprising a first dichroic mirror reflecting infrared radiation and being transparent to visible radiation, said mirror being placed upstream from the line and raster analysis system, a second dichroic mirror reflecting infrared radiation and transparent visible radiation located such that the element sensitive to infrared radiation is symmetrical with said electroluminescent diode with respect to said second mirror, said second mirror forming with the mirrors parts of paraboloids, at least one of which is a paraboloid of revolution about the axis of rotation, a sensitive element image transport mechanism on said axis, an objective functioning in the visible with the same focal length as that of said scanning analysis objective, the axis and focus of which are symmetrical with the optical axis and focus of the scanning analysis objective, respectively with respect to said first dichroic mirror, means for bending the visual display beam in the direction of the optical axis of said scanning analysis objective and for straightening out the image, the latter element in the beam path being a semitransparent or dichroic plate, and an axis observation system parallel to the optical axis of the scanning analysis objective for looking through said semitransparent plate.

37. A device in accordance with claim 36, wherein said means for bending the visual display beam and for straightening out the image comprise at least a right dihedral rigidly coupled to said semitransparent plate to make up a trirectangular trihedral.

38. A device in accordance with claim 30, wherein said detector comprises n elements, the detector elements are sensitive to different wavelengths, the electroluminescent diode emits radiation of different wavelengths and the geometric assembly of said detector is identical to that of the diode elements, said assemblies being symmetrical to each other with respect to said plane mirror, said device further comprising means for applying the video signal from a detector element to a diode element, the optical elements functioning as a light filter.

39. A device in accordance with claim 38, wherein said detector comprises two elements, $D_1$ and $D_2$, each of which is sensitive to a wavelength region centered on wavelength $\lambda_1$ and wavelength $\lambda_2$, respectively, element $D_1$ being placed on the axis of rotation of line scanning and element $D_2$ being placed symmetrical to $D_1$ with respect to a dichroic mirror, the dichroic mirror being transparent to wavelength $\lambda_1$ and reflecting to wavelength $\lambda_2$.

40. A device in accordance with claim 38, wherein said detector comprises two elements, $D_1$ and $D_2$, each of which is sensitive to a wavelength region centered on $\lambda_1$ and $\lambda_2$, respectively, and wherein said two detectors are symmetrical with respect to a rotating disk, the surface of the disk being reflecting on its two faces and interspersed with slots, said device further comprising a source of reference radiation emitting in the mean direction with the same inclination on the disk as the mean ray of the analysis beam.

41. A device in accordance with claim 1, wherein said detector comprises n elements, the detector elements are sensitive to different wavelengths, the electroluminescent diode emits radiation of different wavelengths and the geometric assembly of said detector elements is identical to that of the diode elements, said assemblies being symmetrical to each other with respect to said plane mirror, said device further comprising means for applying the video signal from a detector element to a diode element, the optical elements functioning as a light filter.

42. A device in accordance with claim 1, wherein said detector comprises two elements, $D_1$ and $D_2$, each of which is sensitive to a wavelength region centered on wavelength $\lambda_1$ and wavelength $\lambda_2$, respectively, element $D_1$ being placed on the axis of rotation of line scanning and element $D_2$ being placed symmetrical to $D_1$ with respect to a dichroic mirror, the dichroic mirror being transparent to wavelength $\lambda_1$ and reflecting to wavelength $\lambda_2$.

43. A device in accordance with claim 1, wherein said detector comprises two elements, $D_1$ and $D_2$, each of which is sensitive to a wavelength region centered on $\lambda_1$ and $\lambda_2$, respectively, and wherein said two detectors are symmetrical with respect to a rotating disk, the surface of the disk being reflecting on its two faces and interspersed with slots, said device further comprising a source of reference radiation emitting in the mean direction with the same inclination on the disk as the mean ray of the analysis beam.

* * * * *

UNITED STATES PATENT AND TRADEMARK OFFICE
CERTIFICATE OF CORRECTION

PATENT NO. : 4,687,933

DATED : AUGUST 18, 1987

INVENTOR(S) : FERNAND R. LOY

It is certified that error appears in the above-identified patent and that said Letters Patent is hereby corrected as shown below:

Column 12, line 42, change "length $\underline{1}$" to read --length 1--.
Column 12, line 44, change "value $\underline{1}$" to read --value 1--.
Column 25, Claim 25, line 22, change "R = $CD_1$" to read --R = $OD_1$--.

Signed and Sealed this

Twelfth Day of April, 1988

Attest:

DONALD J. QUIGG

*Attesting Officer*   *Commissioner of Patents and Trademarks*